April 12, 1932. A. HOFMANN ET AL 1,853,426
NEEDLE FINISHING MACHINE
Filed Sept. 18, 1930  12 Sheets-Sheet 1
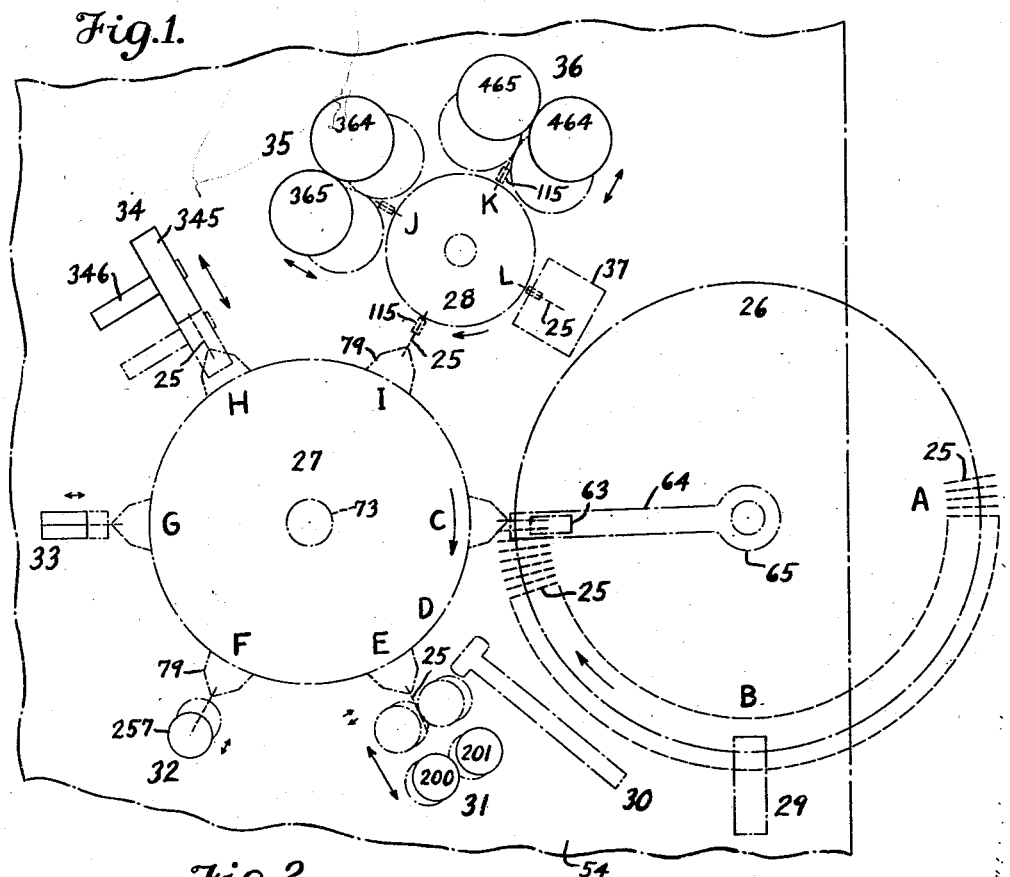
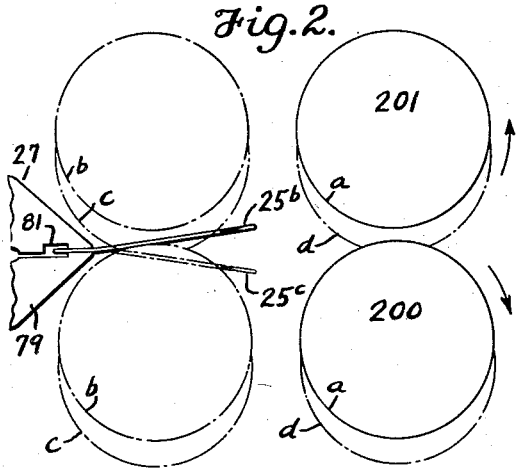
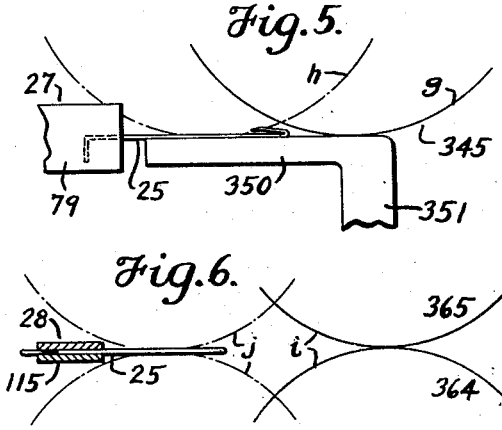
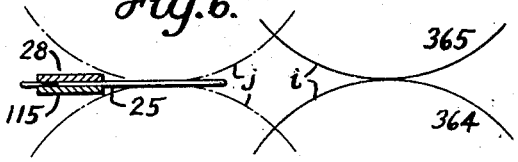
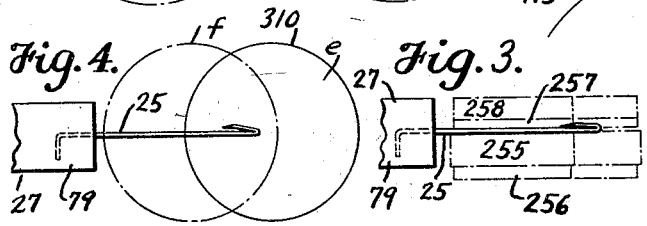
INVENTORS
Alfred Hofmann
& Oswin Kanis,
BY Morrison, Kennedy
& Campbell ATTORNEYS.

April 12, 1932.  A. HOFMANN ET AL  1,853,426
NEEDLE FINISHING MACHINE
Filed Sept. 18, 1930  12 Sheets-Sheet 2
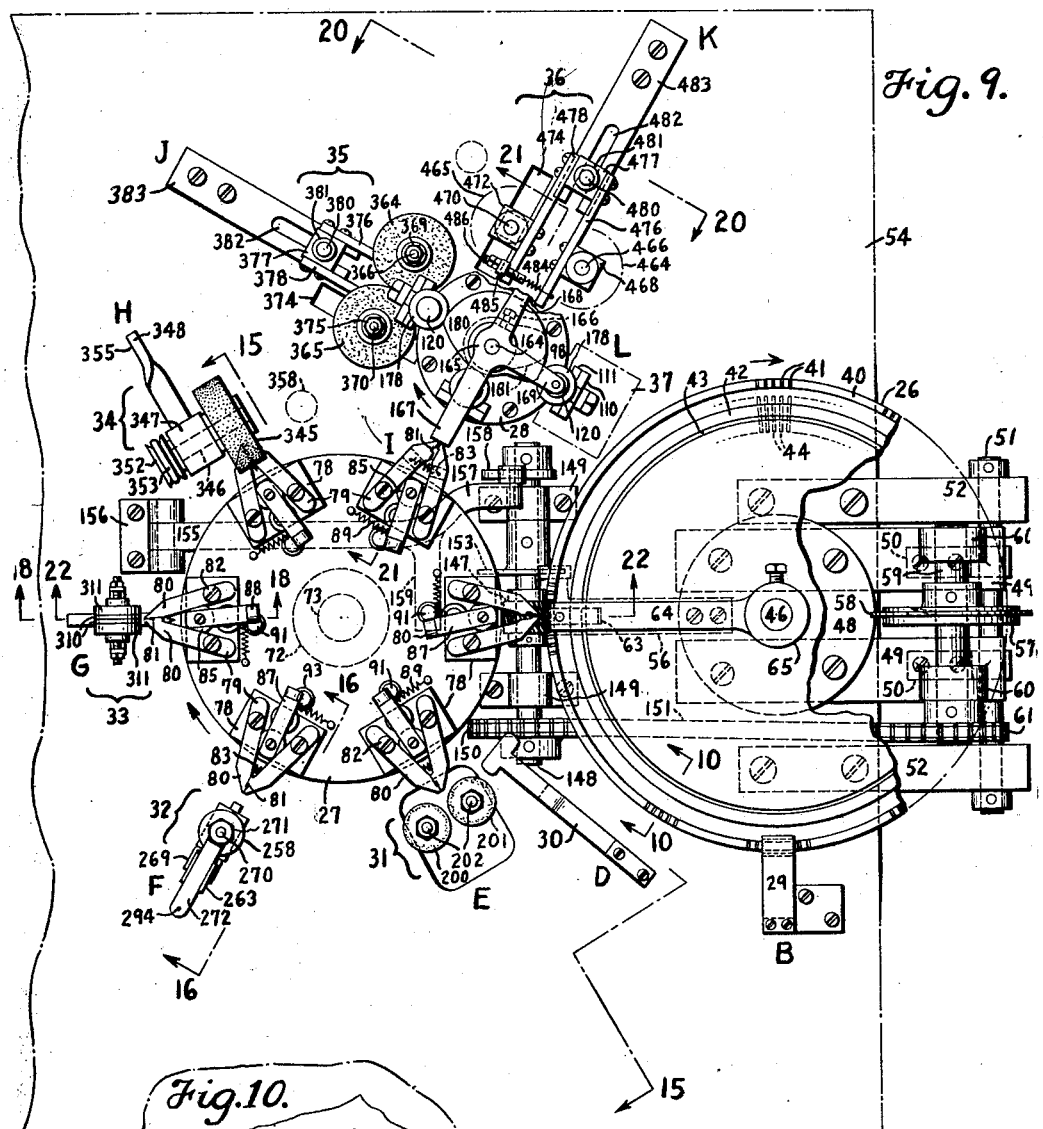
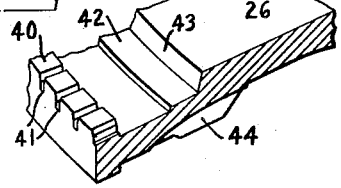

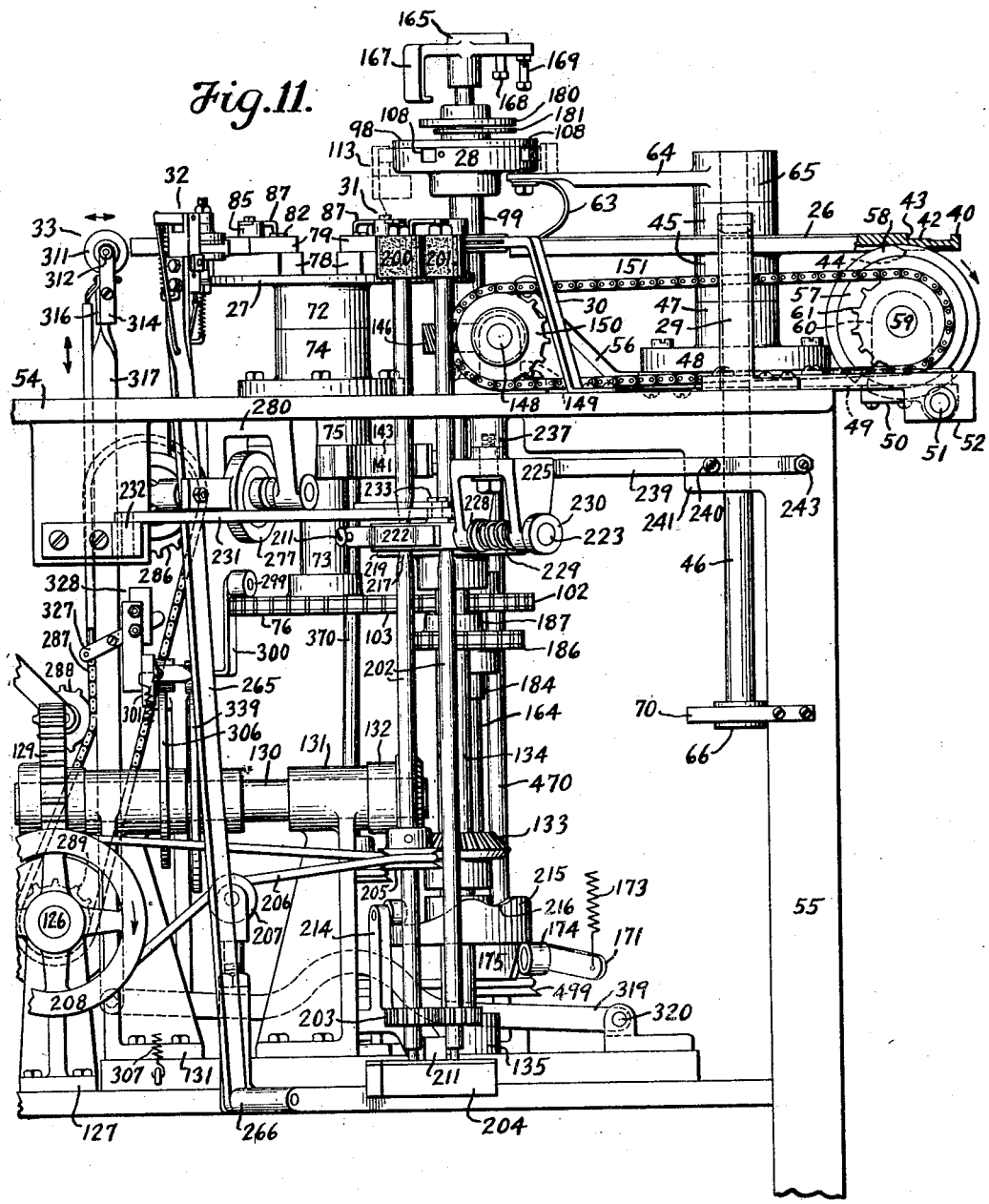

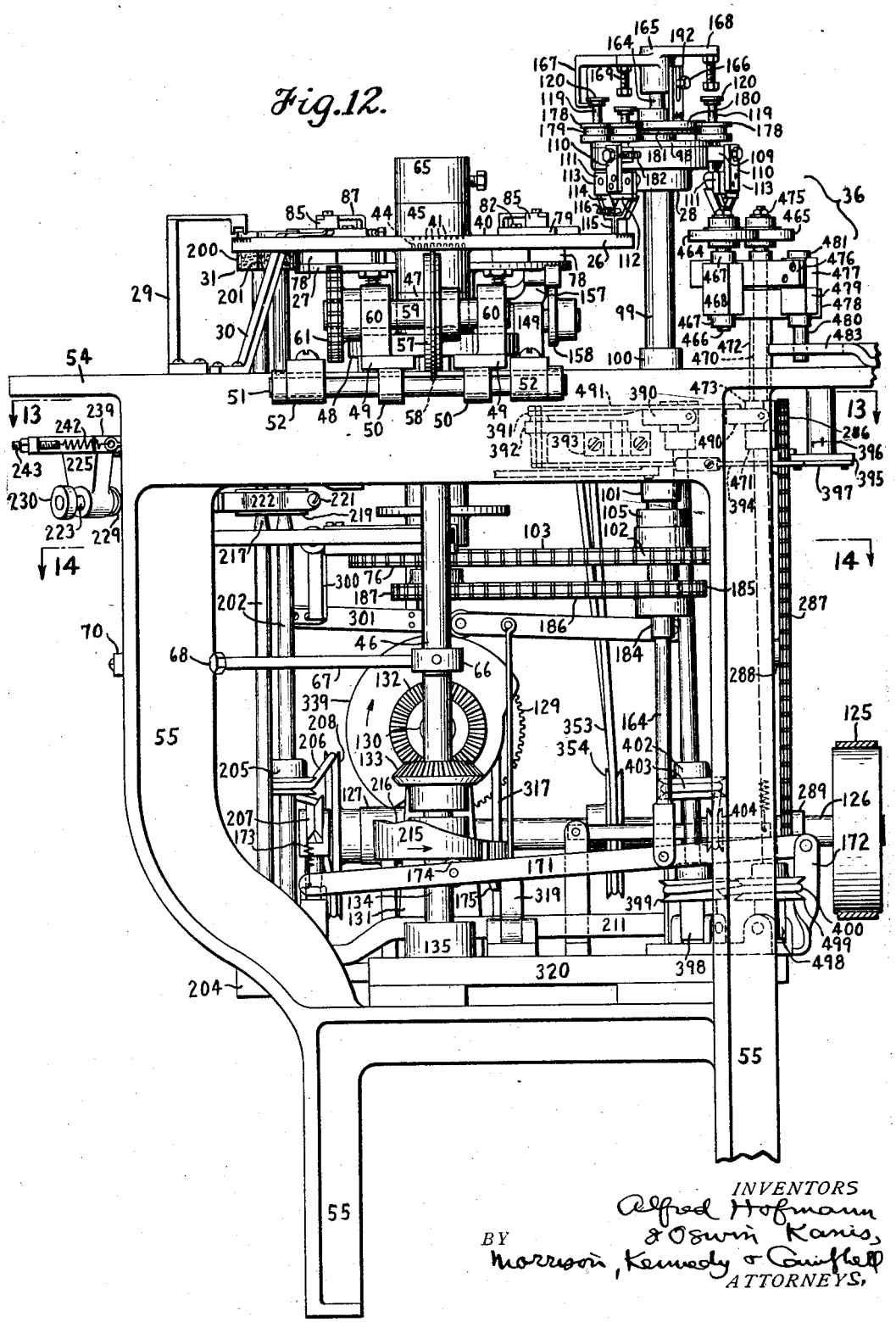

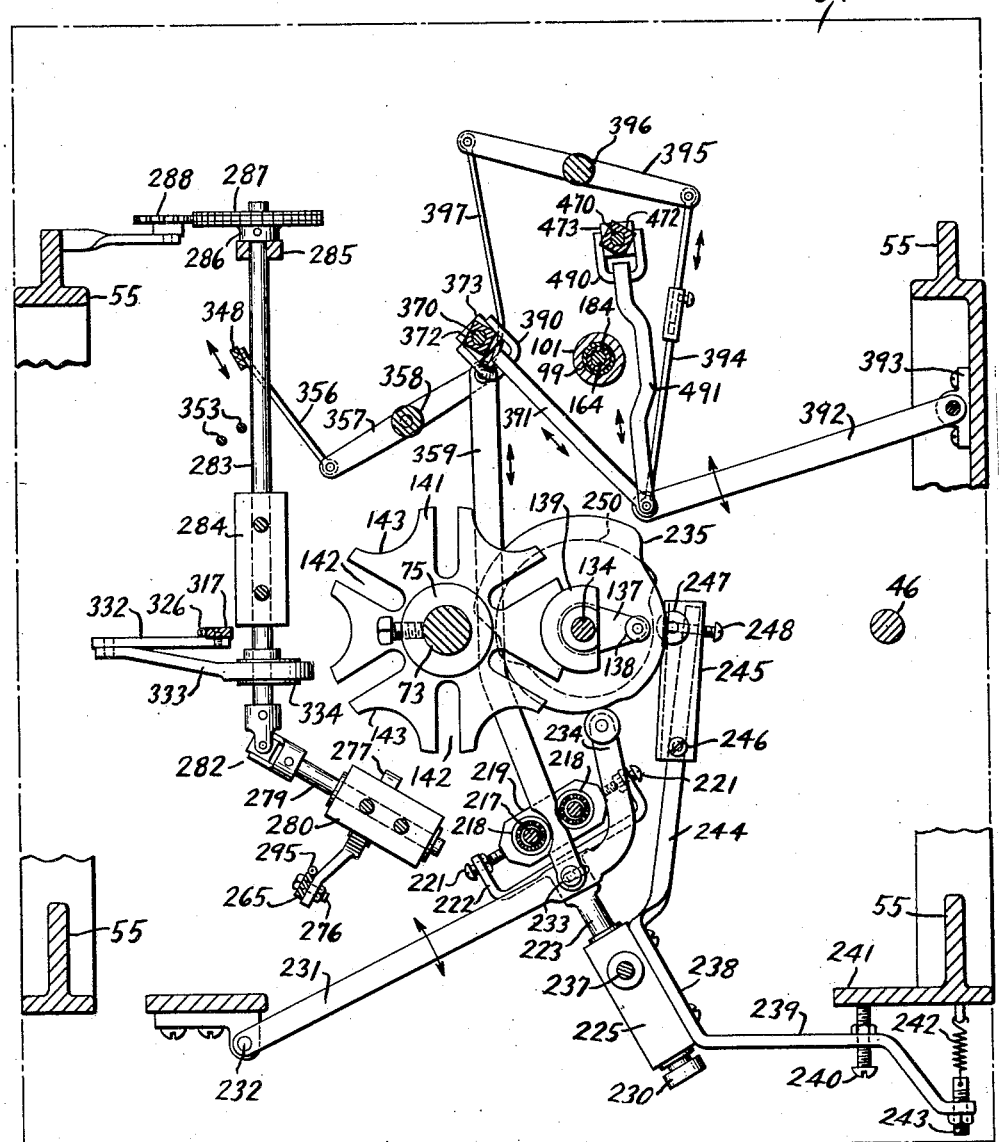

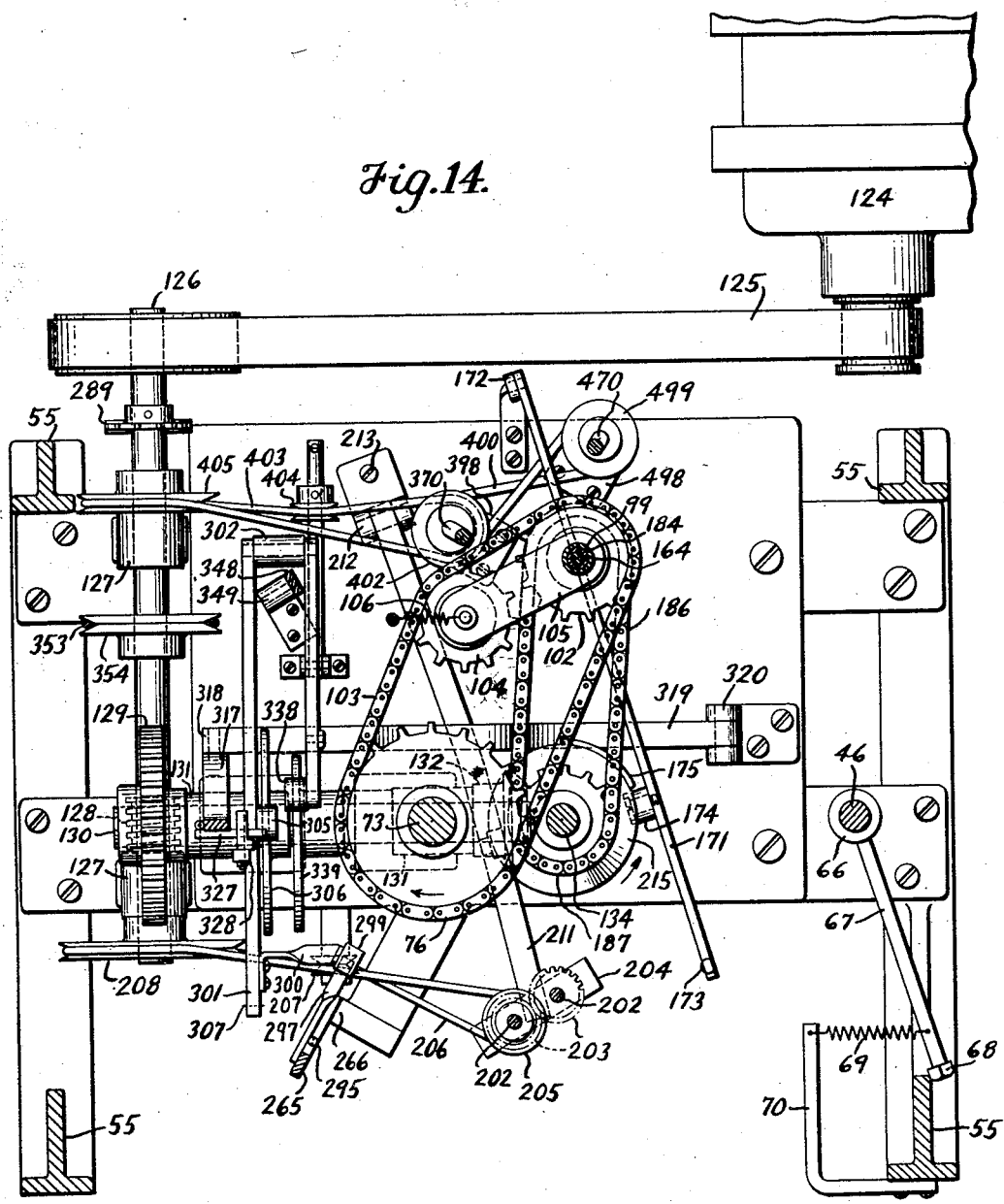

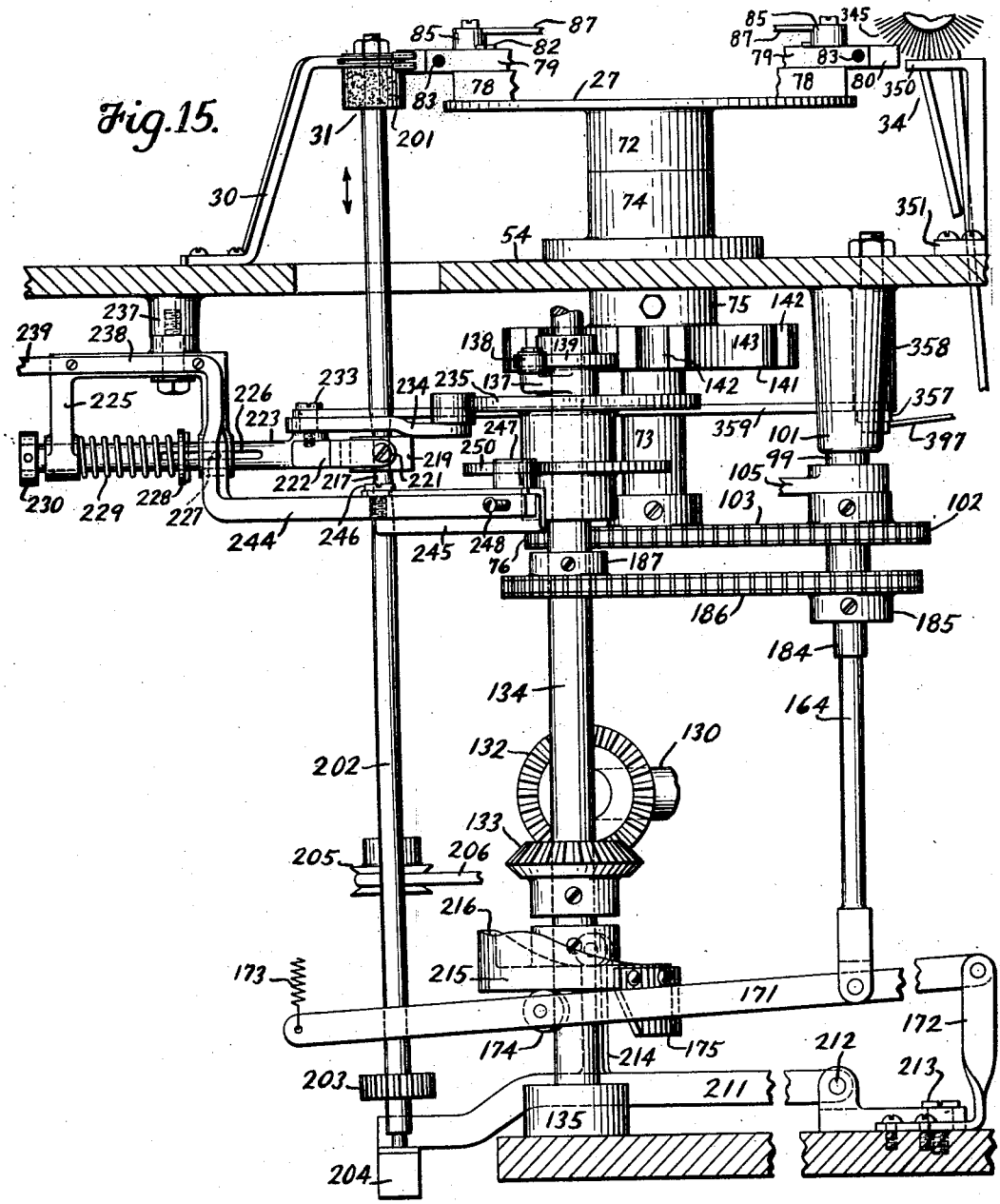

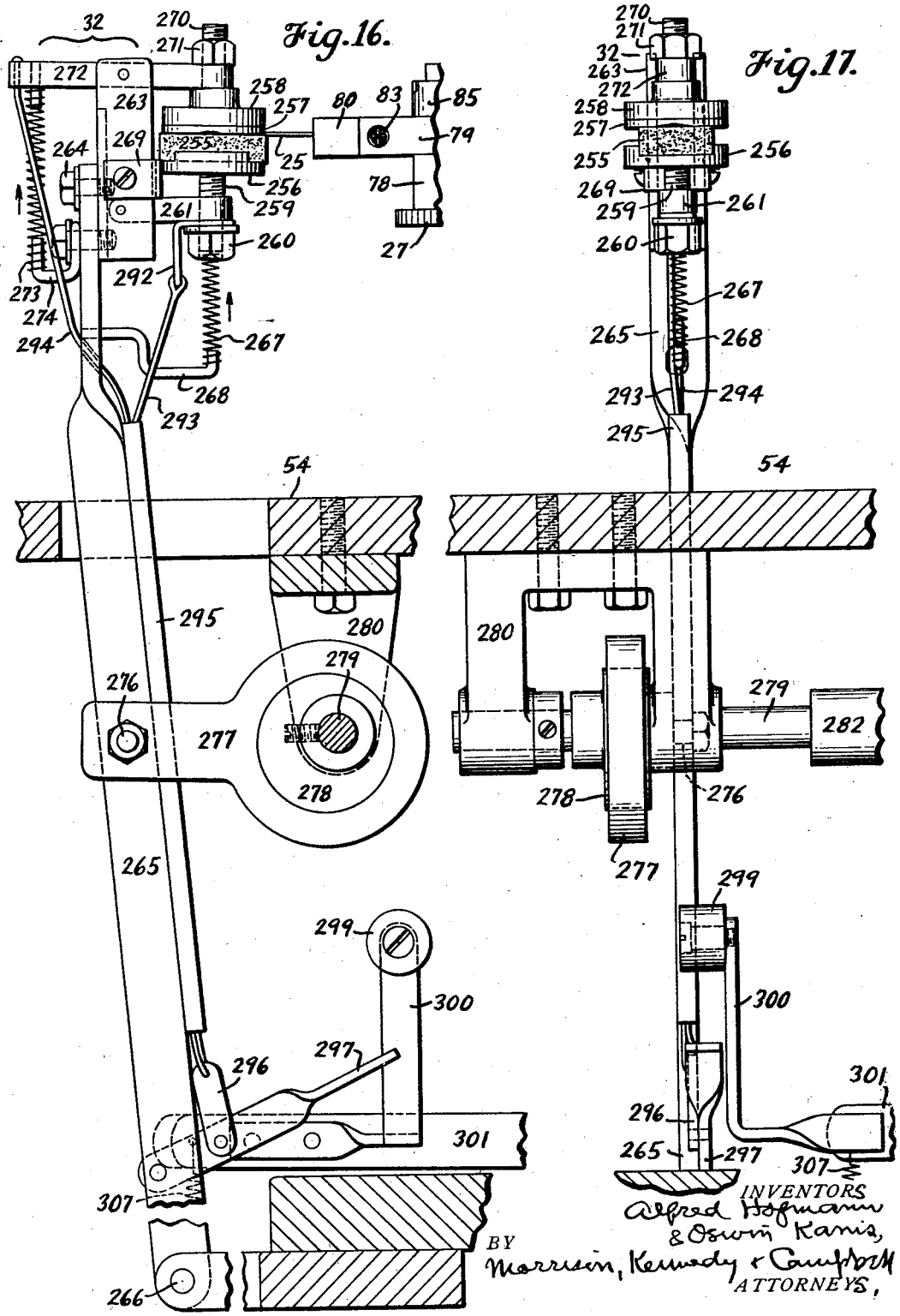

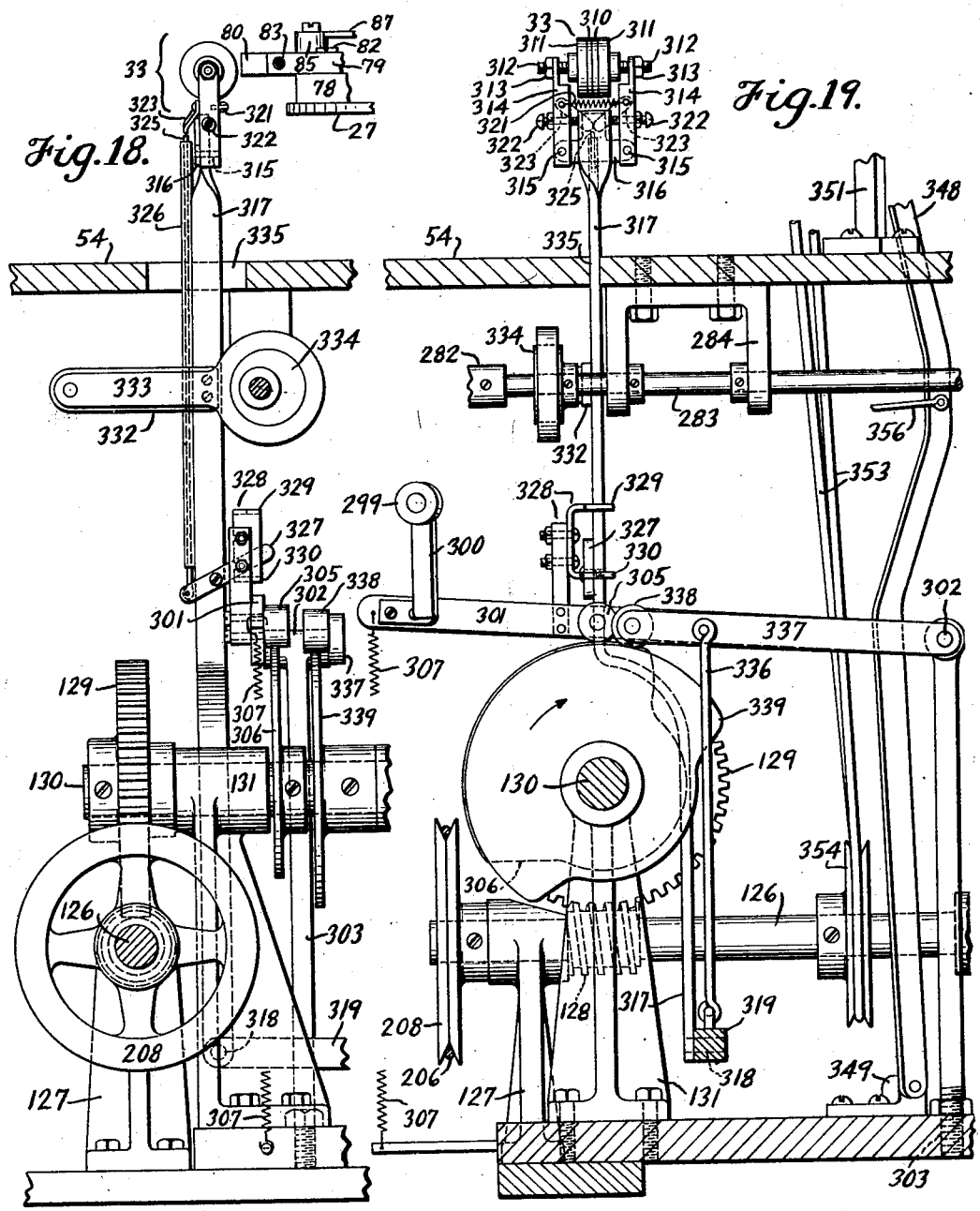

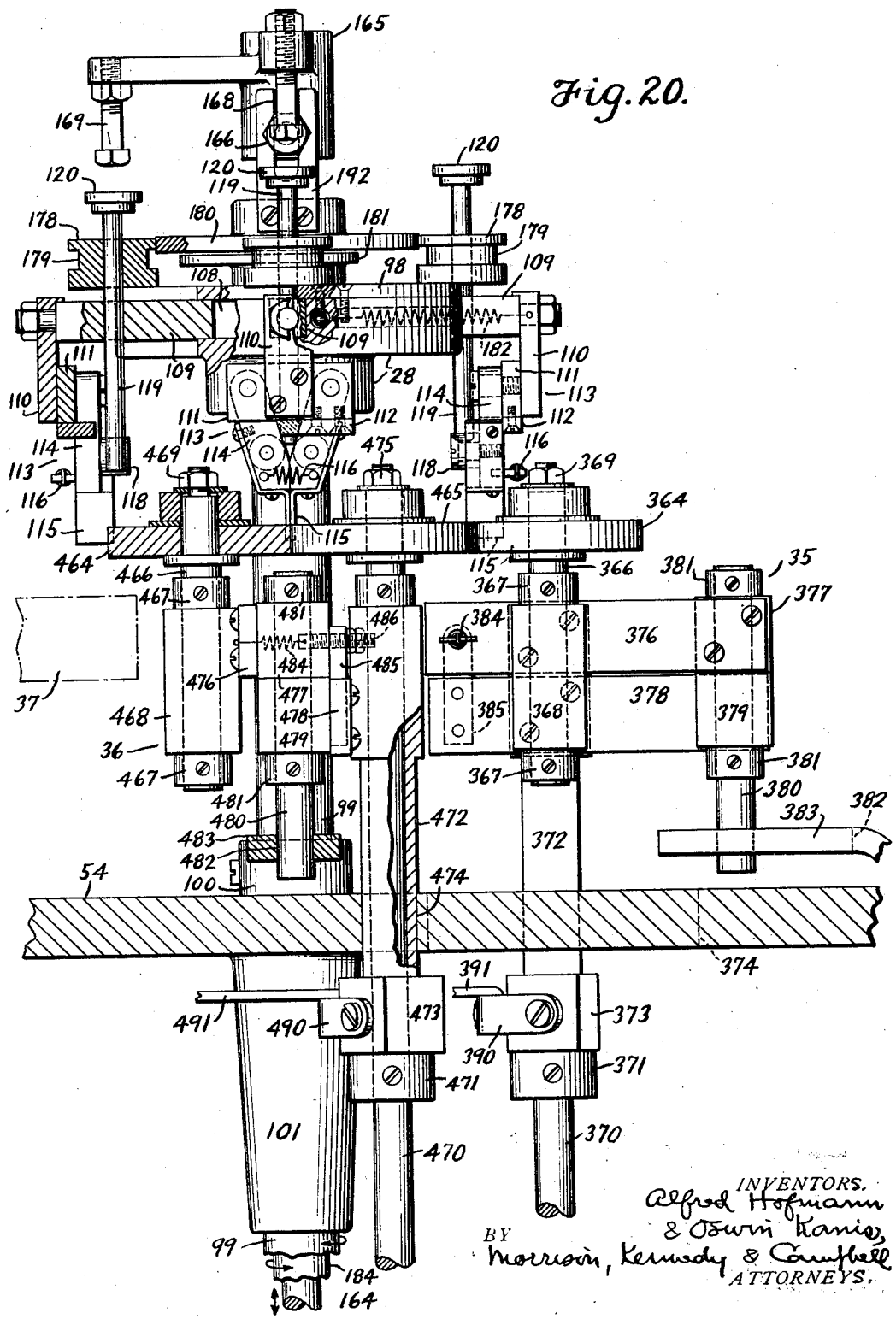

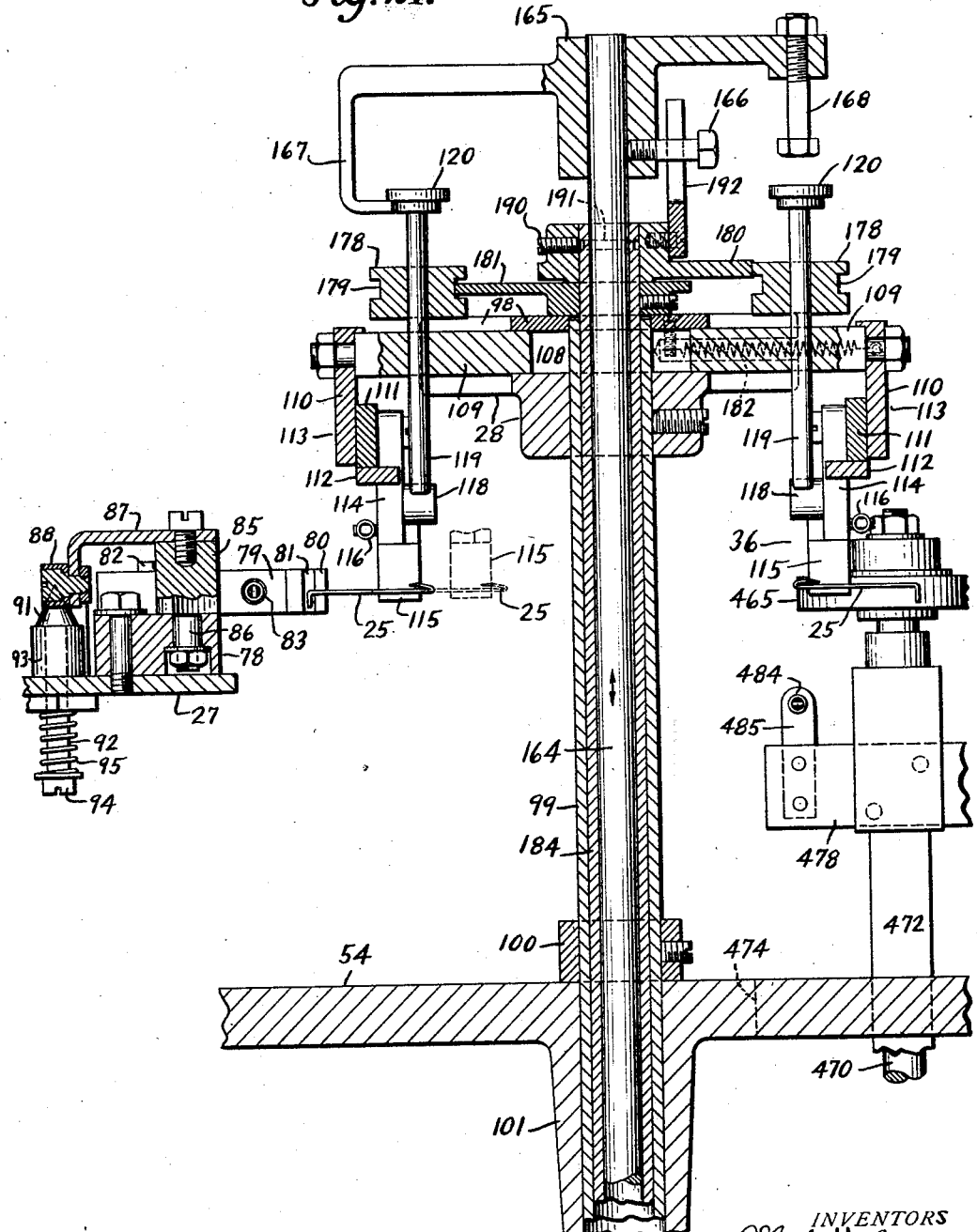

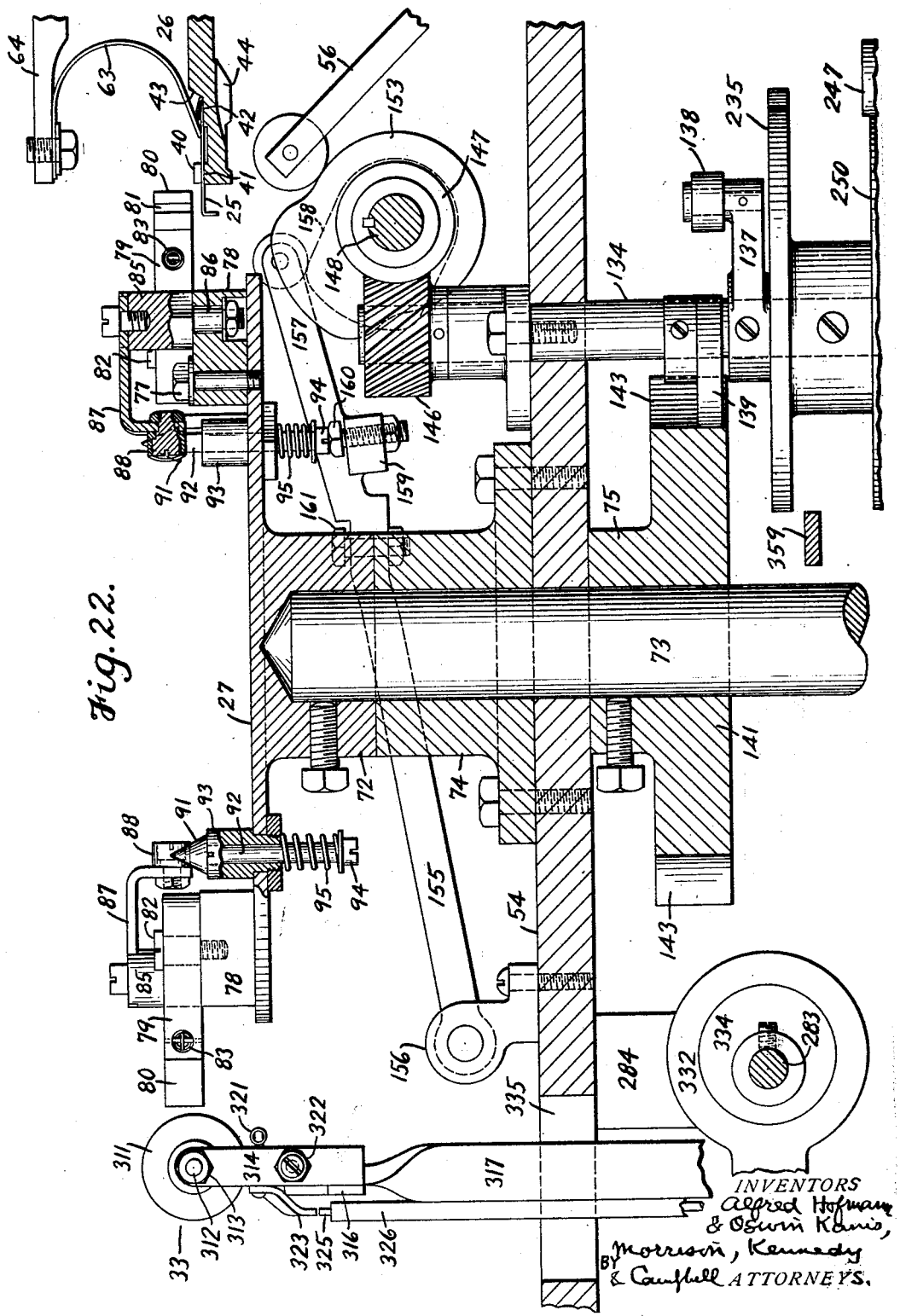

Patented Apr. 12, 1932

1,853,426

UNITED STATES PATENT OFFICE

ALFRED HOFMANN, OF PALISADE, AND OSWIN KANIS, OF LYNDHURST, NEW JERSEY, ASSIGNORS TO ALFRED HOFMANN NEEDLE WORKS, INC., OF UNION CITY, NEW JERSEY, A CORPORATION OF NEW JERSEY

NEEDLE FINISHING MACHINE

Application filed September 18, 1930. Serial No. 482,819.

This invention is a novel needle finishing machine, and relates more particularly to the finishing (for example grinding and polishing) of needles of the class having a thread engaging part or spring beard at one end and a butt by which the needle may be held at the other end, although it can be employed for treating other types and classes of needles. The invention is illustratively shown as applied to the finishing of the so-called spring beard type of needle commonly used in the hosiery knitting machines. Our prior Patent No. 1,696,484 of December 25, 1928 shows a machine for manufacturing such knitting needles, and the product of such machine is a needle which may be perfected by the finishing of its various parts and surfaces, and the purpose of the present invention is to afford an efficient automatic machine adapted to perform suitable finishing operations on such or other needles.

Heretofore the usual method of finishing or polishing needles of the class referred to has been to introduce a large batch thereof in a rotary cylinder or barrel and maintain them under a tumbling action for a sufficient length of time to bring about the polishing of the needles by rubbing and friction against each other and the walls of the barrel. The handling of the needles in bulk in this manner while inexpensive as an operation, brought about extensive losses in damage to the product, and sometimes as high as twenty per cent or more of the needles so tumbled have been broken or impaired so as to render them useless. In addition this method was ineffective and unsatisfactory in that the finishing and polishing was not uniformly or completely carried out, and a relatively high expense for inspection and selection of marketable needles was another drawback.

It is therefore the main object of the present invention to afford a consecutive process and apparatus for the finishing of all important parts of the needle in an orderly and thorough manner, so as not to leave the result to chance nor to incur the recited defects of the usual method. Particularly it is the object of this invention to cause the automatic handling of the needles individually in a uniform and methodical manner so as to treat each portion of each needle as may be required; and it is believed that the present invention is the first adapted to such purposes and results.

A further object is to afford such a needle finishing and polishing machine which is capable of rapid operation, so as to give a large output, and thus minimize the cost of manufacture, as well as improving the quality of the product; also to complete all desirable finishing, including the groove or noucat, and so avoiding supplemental operations.

Other and further objects and advantages of the present invention will be explained in the hereinafter following description of an illustrative embodiment thereof or will be understood to those skilled in the subject. To the attainment of the objects and advantages referred to the present invention consists in the novel needle finishing method and machine, and the novel features of operation, mechanism, combination, arrangement and detail herein illustrated or described.

Description of figures

In the accompanying drawings Fig. 1 is a general diagram in plan view indicating the path of travel of the successive needles and the consecutive operations, treatments or stations A to L through which each needle passes, beginning with the infeed and terminating with the delivery. For purposes of description the portion of the machine nearest to the observer of Fig. 1 will be considered as the front of the machine, the infeeding operator standing at the right side to apply the successive needles to the infeed wheel or disk.

Figure 2 is a similar plan view diagram indicating only the means and mode of treatment at the station E at which the lateral sides of the first or beard end of the needle are rough finished or ground. Fig. 3, in elevation, is a diagram of the next succeeding step or operation at station F of finishing or polishing the narrow or top and bottom edges of the beard end of the needle. Fig. 4, in elevation, is a diagram of the next succeeding step or operation at station G wherein the lateral sides of the needle receive their final polishing. Fig. 5, in elevation, is a diagram of the next succeeding step or station H in which by a brushing action the groove or noucat of the bearded needle is cleaned and finished. Fig. 6, in plan view, is a diagram of the next succeeding operation or treatment at station J wherein the butt end of the needle is finished at its lateral sides while held by the beard end after transfer from the first to the second rotary carrier; and this view indicates also the nature of the next succeeding operation at station K in which the final polishing of the butt end of the needle is effected.

Fig. 7 is a side view of the particular type of needle for the finishing of which the illustrated embodiment of the invention is particularly designed, having the beard and co-operating noucat at one end of the shank and at the other end a butt or lateral holding projection. Fig. 8 is a top plan view of the needle shown in Fig. 7.

Fig. 9 is a general plan view of the machine, with certain parts broken away or omitted for clearness of illustration, the disclosure of this figure corresponding with the plan view diagram of Fig. 1 in showing the relation of the various operations and devices. Fig. 10 is a detached perspective view of a detail of the infeed disk, taken partly in section on the line 10—10 of Fig. 9.

Fig. 11 is a general front elevation of the machine with certain parts omitted and others broken away for better showing of the construction.

Fig. 12 is a right side elevation view of the same.

Fig. 13 is a plan view partly in horizontal section taken on the plane 13—13 of Fig. 12, showing the upper portion of the actuating connections of the machine, including the intermittent drive device giving step by step motions to the two carriers.

Fig. 14 is a plan view taken partly in horizontal section on the plane 14—14 of Fig. 12, showing the lower portion of the actuating mechanism.

Fig. 15 is a vertical section view taken on the line 15—15 of Fig. 9 and showing the first and fourth operations or treatments performed at opposite sides of the first rotary carrier, and the devices and actuating connections therefor. Fig. 15ᵃ is a detail elevation of a needle leveling contact or device.

Fig. 16 is a vertical section taken on the line 16—16 of Fig. 9 showing particularly the second operation or treatment, and the device and actuating connections therefor.

Fig. 17 is an elevation view of the mechanism shown in Fig. 16, looking toward the right side of Fig. 16.

Fig. 18 is a vertical section taken on the line 18—18 of Fig. 9 showing particularly the third operation or treatment, and the device and actuating connections therefor. Fig. 19 is an elevation view of the mechanism shown in Fig. 18, looking toward the right side of Fig. 18.

Fig. 20 is an elevation view partly in vertical section on the line 20—20 of Fig. 9 showing particularly the second rotary carrier or turret and its actuating mechanism.

Fig. 21 is a vertical section on the line 21—21 of Fig. 9, indicating the relation of the first and second carriers.

Fig. 22 is a vertical section taken on the line 22—22 of Fig. 9, indicating the relation between the infeed disk and the first carrier, also certain parts of the device for the third operation or treatment, enlarged as compared with Fig. 18.

Needle finishing method

In general the preferred order of steps of operation and treatment of the successive needles 25 may be outlined as follows, with particular reference to the diagrams, Figs. 1 to 6 and plan view Fig. 9. An advancing infeed conveyor or wheel 26 is employed, followed by a first advancing carrier or rotary turret 27, and a second such carrier or turret 28, by which conveyor and carriers the successive needles 25 are advanced through various movements and pauses, including infeed, transfer, adjustment, treatment and outfeed or delivery of the completed product.

The conveyor or infeed wheel 26 has successive receiving means or slots in which the needles are successively introduced either manually or by automatic devices; and the infeed position or station may be, for example, at A on Fig. 1. This infeed member or wheel is arranged to receive and carry a large number of needles at once, the needles being introduced at the infeed point A. The travel may be step by step. As the needles move around to position B a contact device or guard 29 acts to readjust the needles in the conveyor if incorrectly positioned. As each needle arrives at the first transfer point C it is removed from the infeed wheel by a gripper means on the first carrier 27 by which the needle is held and advanced to the successive treatments. Preferably the needles are initially positioned in the infeed wheel with their butt ends projecting peripherally, so that the first carrier grips and takes each needle by its butt end for subsequent treatment of the beard end.

The revolving carrier 27 is shown as having a set of six such grippers, so that as each needle is advanced from the transfer station C by one gripper the succeeding gripper comes to position to take the next needle. While the infeed wheel may carry a large number of needles and advance with small steps the carrier having only a small number of grippers advances with large steps to the successive treatments. From the transfer point C each needle is advanced by its gripper, while held by its butt end, and during this advancing movement a fixed adjusting contact 30 comes into play at point D to reset or level each needle into its correct plane of travel if out of such plane. The needle however does not come to rest until at the station E where it is held in the gripper by its butt end, with the butt standing downward and the beard end projecting. While so held at station E, the first treatment of the needle is effected, namely a finishing operation at the two lateral sides of the needle. This preferably is a rough finishing or grinding operation by a device 31 comprising rollers working successively or simultaneously upon the two sides of the needle shank as will be described more in detail.

After the first treatment and a succeeding advance of the carrier each needle is brought to the next station F. Here a device 32 comprising a pair of finishing members operates upon the narrow top and bottom edges of the needle including the top of the beard. At the next station G the third treatment is performed by a device 33, arranged to act upon the ground sides of the needle to polish them.

At the next station or pausing position H a finishing device 34, comprising brush elements, acts on top of the needle to give a fourth treatment and clean out and thoroughly finish the groove or noucat.

At a subsequent station I, a transfer is effected, the exposed beard end of the needle being gripped by one of the grippers mounted at the periphery of the second carrier 28 which also has a step-by-step advancing motion. The first carrier is caused to release the needle while the second carrier takes and holds it, following which the second carrier makes an advancing motion to station or position J, where the sides of the butt end of the needle are ground by a device 35; after which the next forward shift brings the needle to position K where the same surfaces are polished by a device 36.

After the next advance to station L the gripper may be caused to open and release or deliver the finished needle into a suitable receptacle or device 37, from which they may be removed to boxes or containers for example in batches of one hundred.

The successive treatments and movements at the various stations, for example at stations E, F, G, H, J and K constitute a method, which may be further described in detail as follows, it being understood that the illustrated order of treatments, while preferred, is optional, and may be varied. The term finishing is used in the sense of performing any treatment to complete or correct the needles as to their surfacing, shape or otherwise; the particular finishing operations herein disclosed including different grades of treatment, such as a preliminary or rough finishing, referred to as grinding, and a final or smooth finishing referred to as polishing.

As already stated the several treatments are indicated diagrammatically in Fig. 1, and the successive treating devices or instruments are correspondingly shown in Fig. 9 at the positions or stations E, F, G, H, J and K. Additionally, the six successive treatments are separately indicated diagrammatically in Figs. 2 to 6 respectively, and the treating devices more in detail in certain other figures, the actuating connections being shown in such other figures and in the general figures.

The first treatment, performed at station E, is separately indicated in Fig. 2, and consists in a grinding action at the two lateral sides of the beard end of the needle by means of a grinding device or pair of stones 31, which may have a four-motion action, these being shown in further detail in Figs. 11 and 15. The pair of stones is slightly spaced apart as at $a$ in Fig 2. From this normal position they shift bodily inward toward the carrier to the position $b$, during which one stone grinds one side of the needle, the stones preferably being rotated to enhance the grinding action, the needle bending over to the position $25^b$. The stones then shift bodily across to position $c$, which bends the needle to the position $25^c$ and from there the stones return outwardly to position $d$, the other stone thus grinding the other side of the needle. More than half the length of the needle is thus rough finished at the lateral sides.

In the second treatment, performed at station F, the top and bottom edges are finished as indicated in Fig. 3, the mechanism being shown more in detail in Figs. 11, 16 and 17. The device 32 consists of an underneath member or stone and a top member composed of a material which will not injure the beard, such as leather or compressed felt. These members are normally spaced apart and are moved inwardly and then brought together to the Fig. 3 position, in which they may be reciprocated inwardly and outwardly several times to give the finishing treatment.

The third treatment is performed at station G and consists of a polishing action at the two lateral sides which have already been ground at station E. Fig. 4 diagrammatically shows the operation, and the details of the device 33 are shown in Figs. 11, 18, 19 and 22. The device may consist of a pair of leather or analogous polishing members or disks brought in and reciprocated against the sides of the needle, between positions $e$ and $f$, Fig. 4.

The fourth treatment consists of cleaning out and finishing the groove or noucat which cooperates with the point of the beard of the needle. The treatment is performed at station H and is shown diagrammatically in Fig. 5 and in further detail in Fig. 15. The device 34 comprises an underneath support which comes up to prevent deflection of the needle and thereabove a finishing member in the nature of a brush, which may be turned at fairly high speed while it is reciprocated inwardly and outwardly between positions *g* and *h*, so that the bristles will effectively enter and finish the interior surface of the noucat.

These four described treatments are effected while the needles are held by their butts in the grippers of the first rotary carrier 27. Fig. 22 at the right side best indicates how the successive needles are introduced into the grippers, namely by a relative vertical movement, the infeed wheel lifting to bring each needle within the gripper before the latter closes; and Fig. 21 best shows the analogous transfer of each needle from the gripper of the first carrier to the gripper of the second carrier, the latter having a radial inward and outward movement for this purpose. This transfer changes each needle end for end, leaving the butt exposed.

The fifth treatment is effected at station J while the needle is held by the second carrier, and is shown diagrammatically in Fig. 6 wherein a pair of grinders or stones 35 are moved inwardly and outwardly from position *i* to position *j* while acting at the lateral sides of the butt end of the needle. The details are further shown in Figs. 20 and 21.

The sixth treatment may consist of a polishing action at station K employing leather or similar members 36, and may be substantially identical with the fifth treatment as indicated in Figs. 6, 20 and 21. At the final station L the gripper is opened and the needle dropped into the receptacle 37.

The machine and its mechanisms will next be described in detail.

Infeed conveyor or wheel

Referring first to the infeed conveyor or rotary disk or wheel 26, this is best shown in Figs. 9-12 and 22. It is a horizontal rotatable wheel liftable at its inner side as will be described. Its upper side is annularly recessed to afford an upstanding rim 40 formed with a great number of radial grooves 41 into which the successive needles are positioned, with their butts protruding and their beards resting on a ledge 42 inwards of the rim, and against a shoulder 43 as clearly indicated in Fig. 22. The underneath side of the wheel is formed with a series of teeth 44 by which the wheel may be rotated, preferably intermittently.

The infeed wheel may be mounted for rotation upon a swingable support as follows. The wheel is provided with a hub 45 extending both above and below its plane and this hub turns loosely on an upright shaft 46, which shaft continues down and passes through a vertical bearing member 47 having a horizontal flange 48 attached to bars 49 which at their outward ends are secured on blocks 50 swingingly mounted on a counter shaft 51 supported in fixed brackets 52. The bars, extending between the vertical bearing 47 and the pivot shaft 51, constitute a support or carriage supporting the infeed wheel and capable of tilting up at its inner part about the shaft to tilt and lift the wheel and each needle into transfer position with relation to the grippers or clamps of the first carrier 27.

The swinging bars 49 by which the infeed wheel may be bodily swung up and down may normally rest upon a fixed stop, and this stop may conveniently consist of the top plate or table 54 of the machine, above which the various operations upon the needles take place. The table top 54 is shown supported upon frame legs 55. Various other frame parts will be described in connection with the parts which they support. The means for intermittently lifting or tilting up the infeed wheel to raise the successive needles into the grippers of the first carrier may comprise an arm 56 attached to the under side of the flange 48 and extending suitably, for example at an upward slant, to where at its free end it carries a roll or follower adapted to co-act with a lifting cam which, with its connections, will be later described.

The means for intermittently rotating the infeed wheel may comprise a feed disk 57 having a cam rib or circumferential tooth 58 arranged to engage one or more of the underneath teeth 44 of the wheel. This rib or actuating tooth 58 may consist mainly of a dwell, so as to hold the wheel stationary during lifting and transfer of needles, but with an offset near one end of the rib such as to throw the infeed wheel ahead by the space of one tooth 44 as the rib reengages beyond the next tooth. The feed gear or cam 57 is shown as secured upon a horizontal shaft 59 which is supported in bearing lugs 60 upstanding from the bars 49, and the shaft has at its end a sprocket wheel 61 whereby the cam may be continuously rotated, the sprocket wheel driven by connections yet to be described.

A resilient guard device 63 is shown mounted at the extremity of a radial arm 64 extending leftward from a hub 65 attached at the top end of the vertical shaft 46. This guard normally overlies several of the needles near the transfer position C, to hold them against displacement, but is connected to be displaced frontwardly, when the infeed wheel lifts, to uncover the foremost needle and permit its extraction from the wheel by the gripper of the first carrier. This motion is conveniently and automatically effected by the following connections. The lower free end of the vertical shaft 46 is shown as carrying a collar or hub 66 from which extends outwardly an arm 67 having at its outer end a head or contact 68 bearing against a frame leg 55 and held yieldingly there by a spring 69 extended from a bracket 70. This arrangement is well shown in Figs. 11 and 12 in connection with Fig. 14. By considering Fig. 11, when the inner or left end of the infeed wheel tilts up, the lower end of the shaft 46 will swing to the left. In each case the movement may be about a half inch, more or less, the distances from the axis being about equal. The head 68 of the arm 67 at the foot of the shaft 46 being held against swinging, this causes a twisting or rotary motion of the shaft inside of the hub 45 of the infeed wheel. The hub or collar 65 at the top of the shaft partakes of the rotary motion and this in turn throws the spring guard frontward to the extent and for the purposes described.

*First rotary carrier*

Referring next to the first carrier or rotary turret, which receives the infed needles from the infeed wheel and carries them through the first four treatments, this is shown as a horizontal disk 27 giving support to the grippers. Referring to Figs. 9, 15 and 22 the carrier or disk 27 is shown as formed with an underneath hub 72 by which it is attached to the top end of a vertical shaft 73 turning in a fixed sleeve or bearing 74 mounted on the machine table 54. Below the table the shaft 73 is shown as having secured to it the hub 75 of the driven member 141 of a Geneva stop motion or intermittent drive device to be later described, and at the lower end of the shaft is mounted a sprocket wheel 76 by which the same intermittent motion may be transmitted to the second carrier.

On top of the first carrier disk 27 is shown, attached by screws 77, a series of blocks 78, preferably six in number, and on top of each of these blocks is mounted a gripper device consisting of a pair of swinging grippers 79 having jaws 80 at their outer ends, each pair of jaws adapted to hold a needle by its butt end, and one of the jaws for this purpose having a vertical groove 81 to accommodate the needle butt. The grippers are mounted by pivots 82 upon the blocks and near their jaw ends they are interconnected by a strong tension spring normally holding the jaws tightly together upon the needle.

By this arrangement the operation of the grippers may be effected through means arranged to open the jaws and to allow them to be closed by their spring. For this purpose a cam or wedge member 85 is shown mounted between the shanks of each pair of grippers. A suitable construction is indicated at the right of Fig. 22 wherein the wedge or spreader 85 is mounted by a pivot 86 in the block 78, this member being generally circular but having flat sides contacting against the gripper shanks, so that upon rotation of the member the grippers are forced open. The wedge or spreader at its upper part has an operating arm 87 extended toward the center of the carrier and at its extremity provided with a roller 88 by which it may be actuated. A spring 89 tends to restore the arm and spreader to normal position with the gripper closed.

The swinging of the spreader arm 87 to open the gripper may be effected through a vertically moving member 91 in the nature of a cam or wedge, operating against the roller 88 when shifted. For example the member 91 may be of the shape of a cone and fitted to be thrust upwardly so that the conical surface will thrust the roller 88 against the pull of the spring 89 to open the gripper. As shown at the left of Fig. 22 the conical wedge 91 is shown mounted at the top end of a shank 92 which slides in a vertical bearing 93 attached on top of the carrier 27, the shank having an enlarged contact member or head 94 at its lower end, the same spaced downwardly from the carrier disk, and with a compression spring 95 inserted above the head so as normally to press down thereon and hold the wedging cone in its lowered position. The means for lifting the cone to cause the gripper to open will be later described.

The grippers are adapted to clamp and hold in proper position needles of varying thickness, length or style, and generally speaking the entire machine can handle such variations, as each needle is treated separately at its two ends, and the treatments overlap. Changes of length of needle may be accompanied by relative adjustment between the infeed wheel and the first carrier, or else a modified positioning of the needles upon the infeed wheel.

*Second rotary carrier*

The second carrier disk or turret 28 is shown arranged at a substantially higher level than the first carrier 27 and with a series, for example four, needle grippers depending therefrom. Reference may be had to Figs. 9, 12, 14, 20 and 21. The second carrier 28 is shown as a circular casting formed with interior grooves and closed by a cover 98, the carrier and cover being fixedly mounted at the top end of a vertical sleeve or hollow shaft 99 which not only supports but gives the intermittent advancing movements to the carrier. The sleeve 99 extends downwardly through the machine table 54, and above the table has an attached collar 100 by which it is adjustably rested upon the table. Below the table and sleeve rotates in an elongated bearing 101, as well shown in Fig. 21, and at the bottom end of the sleeve, as shown in Figs. 12 and 14 it is provided with a sprocket wheel 102 for driving it.

Conveniently the second carrier may receive its step by step movements from the first carrier, for example as follows. A sprocket chain 103 is shown extending around the sprockets 76 and 102, thus coupling the shafts of the two carriers. The sprocket chain may be slack and its slackness taken up by an idler sprocket 104 mounted on a swinging arm 105 and pulled by a strong spring 106 as shown in Fig. 14 to maintain the connections in proper running condition.

There being four grippers on the second carrier 28 the latter is shown as formed with four radial grooves 108 accommodating as many radial slides 109, each of which at its outward end has a depending bar 110 which gives support to a cross block 111. At the under side of the block is a stop plate 112 having a portion projecting inward between the grippers to be described to center them in their closed position.

The grippers 113 are shown as pivoted at their upper ends to the cross block 111, their shanks normally converging into contact as best shown in Fig. 20. Preferably detachable jaw pieces 114 are provided, the lower extensions of which constitute jaws 115 arranged at such a height as to be able to take and grip the needle 25 when released from the grippers 79 of the first carrier, as indicated at the left side of Fig. 21. The shanks of grippers 113 have outstanding pins carrying a strong tension spring 116 pulling the grippers toward each other, analogously to the grippers of the first carrier.

For opening the grippers of the second carrier to receive the needles each of the shanks of each gripper is shown as provided with a contact roll 118, these two rolls normally spaced slightly apart and being adapted to be wedged further apart by a member in the nature of a cam or spreader 119 and shown as a vertical rod slidingly mounted in the corresponding radial slide 109, so that the rod is maintained in proper relation to the grippers during the inward and outward movements of the slide. It will be understood that the grippers 113 are normally in their inward positions indicated in dotted lines in Fig. 21. With a gripper in this position at the transfer point I, and the spreader rod moved downward to open the gripper, it is then possible for the slide 109 to be moved outward and thus bring the gripper into gripping relation to the beard end of the needle, as in full lines in Fig. 21, before the rod is lifted to allow the gripper to close on the needle and before the gripper 79 of the first carrier 27 opens to release the needle. Each of the four spreader rods 119 is formed with an enlarged head 120, adapted to be thrust down at certain times to open its gripper, and to be lifted at other times to cause the closing of the gripper, such up and down movements effected by connections later to be described. Likewise the connections for effecting the inward and outward movements of the slides 109, and thereby the grippers, will be later described.

*Power drive and connections to infeeder and carriers*

It will be convenient next to refer to the power drive and certain of the principal shafts, and thereafter the connections to the infeeder wheel and the carriers. The machine may be operated by electric motor 124 as seen in Fig. 14, this being connected by the power belt 125 with a high speed power shaft 126 extending fore-and-aft in the lower part of the machine and shown also in Figs. 11, 12 and others. The power shaft is shown mounted in bearings 127 and carries various pulleys and gears which will be referred to from time to time.

A worm 128 on the power shaft is arranged to deliver a reduced speed drive to a worm wheel 129 on what may be termed the main horizontal shaft 130 extending right and left and supported in fixed bearings 131. This main shaft carries certain connecting members including a bevel gear 132 meshing with a bevel gear 133 mounted on what may be termed the main vertical shaft 134 supported in bearings 135.

The vertical shaft 134 carries various connecting means, one of which is the driving member 137 of a Geneva stop or intermittent drive device, best shown in Figs. 13 and 22, and comprising a driving pin 138 and a locking arc 139 cooperable with the driven member 141 of this device, the hub 75 of which has already been described as secured upon the vertical shaft 73 which carries the first carrier 27 and has connections for the drive of the second carrier 28. The driven member 141 comprises radial slots 142 engageable by the pin 138 and concave arcs 143 engaging by the locking arc 139, in well known manner; so that this driven member, comprising six parts, will be advanced 60° with each complete turn of the main vertical shaft 134, the advancing being effected smoothly in a relatively small part of one rotation of the vertical shaft, and the driven member being locked against displacement during the remainder of the rotation.

The cycle of action of the machine may be considered as a single rotation of the main shafts 130 or 134, during which the power shaft 126 makes many turns, the first carrier shaft makes one sixth of a turn followed by a pause, and the second carrier shaft one fourth of a turn followed by a pause, while the infeed wheel advances by the small distance between two needles.

The connections for rotating the infeed wheel 26 through the sprocket wheel 61 may now readily be described as follows. At the top end of the main vertical shaft 134, above the machine table 54, the shaft carries a helical gear 146 which is arranged to mesh with a complementary helical gear 147 on a horizontal shaft 148 mounted in bearings 149 above the table 54, these parts being well shown in Figs. 9, 11 and 22. The shaft 148 also carries a sprocket wheel 150 and this is connected by a sprocket chain 151 with the sprocket wheel 61 on the shaft 59 that carries the member 57 which intermittently advances the infeed wheel.

Lifting or tilting up of the inner side of the infeed wheel at the time of transfer of each needle to a gripper of the first carrier, and its subsequent lowering is shown as effected, in time with the other operations, through a cam 153 mounted for convenience on the shaft 148 and arranged to cooperate with the roller at the free end of the tilting arm 56 as clearly shown in Figs. 9 and 22.

The automatic opening and closing of the grippers 79 of the first carrier may be effected as follows, bearing in mind that each of the six grippers must be opened at the transfer point C where it receives a needle from the infeed wheel and must be opened again at the transfer point I where it yields up the partly finished needle to the gripper of the second carrier. A gripper opening lever 155 is shown fulcrumed at 156 upon the left side of the table 54. The free end of the lever has a cam extension 157 carrying a cam roll bearing upon the periphery of a cam 158 mounted on the shaft 148 already referred to and which shaft makes a complete rotation for each advancing movement of the first carrier, due to the one to one ratio of the helical gears 146—147. The cam 158 is seen in Figs. 9 and 12 and in Fig. 22 the contour is shown, by which the two grippers at C and I are opened, maintained open for a fraction of a rotation of the shaft and allowed to close. The connections from the gripper opening lever 155 to the grippers consist of an extension 159 giving support to an adjustable contact 160, the lever 155 carrying also an adjustable contact 161, which two contacts, during their lifting movement, come into contact with the contacts 94 of the grippers, thus lifting the stems of the gripper opening wedge members as already described, and later lowering them.

The grippers 113 of the second carrier must receive not only opening and closing movements, but also radial inward and outward movements as described and the following connections may be employed for these respective operations.

The opening and closing movements of grippers 113 of the second carrier may be effected through a vertical rod 164 located centrally inside the sleeve 99 which gives rotary support to the second carrier. See Figs. 9, 12, 20 and 21. The rod 164 is arranged for up and down movements but against rotation, and at its top it carries an enlarged head 165 secured by an attaching screw 166. The gripper opening and closing rod 164 carries the following arms extending laterally from its head 165. The first arm 167 extends above the transfer point I from the first carrier, and is bent down into a position underlying the head 120 of the gripper opening rod 119 at that point, so that an upward movement will lift the rod and permit the closing of the gripper by its spring. The drawings show the parts so lifted. The second arm 168 is arranged above the final polishing position K and is constructed with a downward contacting extension cooperable with the head 120 of the corresponding rod 119, so that when the arm is depressed it will thrust down the rod toward but not to gripper opening position. The third arm 169 extends to a somewhat lower level than the arm 168, but otherwise is similar and is positioned over the delivery point L of the system, and completes the depression of the rod 119.

These three gripper operating arms cooperate in that the first of them causes the closing of each gripper upon each needle as it comes to position I, the needle remaining held in the gripper, the arm at position K thrusting the rod down, not sufficiently to open the gripper but enough to clear the third arm, and the third arm depressing the rod fully so as to wedge open the gripper and release the needle to drop into the delivery container 37. The needle is thus gripped at I, then advanced to and held at J for grinding, then advanced to and held at K for polishing, then advanced to and discharged at station L.

These operations may be automatically carried out in time with the other operations by means of connections at the foot of the vertical rod 164, for example as follows. The rod at its foot has a pivot connection with a substantially horizontal cam lever 171 mounted on a fixed fulcrum 172 and pulled up at its free end by a spring 173. See also Fig. 15. The lever 171 carries a cam roll 174 which is engageable by a cam 175 mounted on the continuously rotary shaft 134. By this arrangement the cam, at the proper time, throws down the lever and rod, which are shown in their elevated positions in Figs. 12, 15, 20 and 21, and later lets them up.

The cooperative inward and outward movements of the grippers 113 may be effected by the following means. Each of the gripper opening rods 119 is shown surrounded by a cam follower 178 in the nature of a roller overlying the cover plate 98 of the second carrier, each roller having a groove 179 between its upper and lower flanges, and being acted upon by two cams 180 and 181.

The cam 180 is arranged concentrically with the carrier and cooperates with the top flanges of the rollers 178, but is held against rotation in the position shown in Figs. 9 and 21. The second cam 181 engages the grooves 179 of the rollers and itself makes one rotation in each cycle. Incidentally this engagement has the effect to hold each roller against accidentally lifting at such time as the rod 119 is being lifted through the roller to cause the closing of the gripper.

The cam 181 is shown mounted for continuous rotation by being attached at the top end of a rotary sleeve 184 which extends downwardly within the supporting sleeve 99 and surrounding the interior rod 164. The continuous rotation of the sleeve 184 is shown effected through a sprocket wheel 185 attached near the lower end thereof, this being connected by a sprocket chain 186 with a sprocket wheel 187 on the main vertical shaft 134.

To prevent rotation of cam 180, which surrounds sleeve 184 it is shown as having a loose connection with the sleeve by threaded pins 190, extending through the hub of the cam into a circumferential groove 191 in the sleeve, the hub carrying an upstanding finger 192 forked to straddle the attaching screw 166 of the head 165, as a convenient non-rotatable part.

The cooperation of the cams 180 and 181 in shifting the grippers is as follows. The cam 181 turns continuously, and operates upon that gripper which at the time is at the receiving station I. While the second carrier and gripper pause the cam moves the gripper outward while it is open, its jaw thus embracing the needle. The gripper is allowed to close and the needle is taken from the first carrier while the gripper is held outward, and then the cam 181 lets the gripper return inwardly by the spring 182, after which the cam rotates idly until returning to the same point. The other or fixed cam 180, acting on the roller 178, as each gripper advances, causes the latter to shift out again, as clear on Fig. 9, so that it is held properly for the finishing treatments at J and K, and brought to the delivery L, the cam having a continuous dwell around these positions.

*Needle movements and treating devices*

Having described the infeeding conveyor and the two carriers with their needle grippers and actuating connections, it will be convenient next to review the path and movements of each of the needles, and as the travel thereof progresses, to describe in detail each of the treating devices and the automatic connections for actuating the same.

At station or point A the needles are manually inserted in the grooves 41 of the infeed wheel. The operator may stand around at the right side of the machine and position the successive needles as rapidly as desirable, irrespective of the advance of the wheel. The inserting may be carried around as far as desired toward the transfer point, and may be suspended from time to time without suspending the operation of the machine. During this operation the infeed wheel is being lifted and lowered as described, but this motion is negligible at the infeed point, which is over the shaft or pivot about which the tilting occurs.

When each needle advances around to the point or station B the fixed guard or contact 29 comes into play to insure that the needle has been properly inserted in the infeed wheel. See Figs. 9 and 12. The lift of the wheel causes a relative lowering of the contact which thereby depresses the needle into correct position.

At the transfer point C the infeed wheel is lifted so that the butt end of the foremost needle passes between the jaws of the open gripper 79 at that point on the first carrier. The lifting movement causes the spring guard 63 to slide forwardly sufficiently to uncover the foremost needle, so that on the dropping of the infeed wheel, after the closing of the gripper, the needle will be left held in the latter, with its butt engaged in the groove 81 of one of the gripper jaws, and the beard end projecting, with the beard at the top side.

As each needle is advanced by the first carrier from transfer position C to the first treatment position E it travels between the two parts of the adjusting or leveling contact 30 at point D, this contact operating upon any needles that have been slightly displaced and resetting them upwardly or downwardly to their correct height as required for the subsequent treatments. See Figs. 9 and 11, showing that the contact 30 has upper and lower plates with a converging slot between them.

*First treating device and its actuation*

The first finishing treatment is effected at station E by the device 31 as shown in Figs. 1, 2 and 9, with the details shown in Figs. 11, 12, 15 and others. The device is shown as consisting of grinding rolls 200 and 201 which may be composed of a suitable stone having an abrasive action to be applied to the lateral sides of the beard end of the needle. Four sets of motions are transmitted to the grinders, namely a fast rotation, inward and outward movements along the sides of the needle, a lateral shaft from one side to the other, and up and down movements, the last mentioned serving to distribute the wear and increase the life of the rolls, which have a substantial vertical dimension, as well as to drop the device out of the way when out of action.

The grinding rollers 200 and 201 for these purposes are shown mounted at the top ends of twin shafts 202, carrying mutually engaging pinions 203 near their lower ends, the lower ends of the shafts mounted for rotation in a floating bearing 204, which may comprise ball bearings with thrust bearing elements to carry the weight of the shafts. Rapid rotation of the shafts may be effected through a pulley 205 on one of them, this driven by a belt 206 extending over an adjustable idler pulley 207 and engaging the rim of a driving pulley 208 mounted directly on the high speed or power shaft 126.

The bodily up and down movements of the grinding rollers are effected by lifting and dropping the bearing 204 which supports the lower ends of the shafts. This bearing is carried on a swinging lever 211 pivoted upon a base member 212 which in turn is swingable horizontally about a vertical fulcrum 213 to permit the lateral shift movements referred to. The up and down movements may be effected through an upward extension 214 of the lever 211, this extension having a roll engaging on top of a lifting cam 215 mounted on the main vertical shaft 134. By this means the rotation of the cam, once during each cycle, causes the bodily lifting of the grinding device, with a dip in the cam at 216 to produce additional down and up movements.

The inward and outward movements and the lateral shifting movements, in accordance with the motions already described in connection with Fig. 2, may be produced by mechanism such as the following. Each of the vertical shafts 202 has a reduced portion 217 presenting a relatively small circular section at a point somewhat below the level of the machine table 54. See also Fig. 13. Each of these shaft portions passes through the inner race of a ball bearing 218, this race forming a guide which permits up and down sliding movements, while the bearing permits the high speed rotation described. The two ball bearings 218 are contained in a carriage 219. This double bearing device in connection with the double bearing 204 at the bottom constitute the supporting means for the shafts.

The bearing carriage 219 is shown mounted with a trunnion or gimbal joint 221 upon a yoke 222 through which the in and out and lateral movements are transmitted, this joint permitting the necessary tilting action. The yoke 222 is formed with a stem 223 which is mounted for inward and outward sliding in a swingable frame 225 of inverted U-shape. To prevent rotation of the stem in the frame the stem has a keyway or slot 226 engaged by a pin 227 on the frame. In order to press the stem, yoke and carrier inwardly, against the cam action to be described, the stem is provided with a washer or collar 228 held by a pin on the stem inside the frame, and engaged by a spring 229 confined between the washer and the outer arm of the frame, the stem sliding through the two arms of the frame, and having a stop collar 230 at its outer end.

In order to force the stem and connected parts outwardly against the action of the spring there is shown a swinging arm 231 having a fixed fulcrum 232. See Figs. 11 and 13. This arm has a slot and pin connection at 233 with the stem 223, and the arm is continued beyond this point and is bent rearward at 234 where it carries a cam roller engageable on the periphery of a cam 235 mounted on the main vertical shaft 134. It may be mentioned in passing that the movements effected by the action of the cam 235 on the lever 231, 234 are utilized to effect the inward and outward movements not only of the grinding device at E, but of a number of other treating devices including those located at stations H, J and K, which make but one inward and one outward movement in each cycle, the connecting rod 359 extending rearward from arm 231 conveying these other motions as will be described.

The lateral shifting movements of the grinding device are shown effected by swinging the open frame piece 225 about a vertical fulcrum 237 beneath the machine table. The frame carries with it the sliding stem 223 and the carriage 219 in which the bearings of the twin shafts are mounted. These shifting movements may be transmitted by separate cam connections, and for this and other purposes the frame 225 is shown as having attached to it a bent bar or strip 238. See Figs. 11, 13 and 15. The bent member 238 is shown having an extension 239 which carries an adjustable stop 240 engageable against a fixed frame member 241, thus limiting the swinging motion in one direction. The same arm 239 is shown as connected by a tension spring 242 with the same frame part 241, this connection being adjustable by a screw 243 to vary the tension of the pull.

The bent member 238 has a second extension or arm 244, near the end of which is an adjusting piece or angle iron 245, pivoted at 246 to permit adjustable swinging. The angle iron carries a cam roll 247, and the relative positions of the angle iron and roll with respect to the arm are changeable by an adjusting screw 248. The cam roll bears against the periphery of a cam 250 mounted on the main upright shaft 134 below the cam 235. In the position shown in Fig. 13 the roller is slightly out of contact with the cam, and when in this position the stop screw 240 may be adjusted so as to predetermine one lateral position of the grinding device, thereby to adjust one of the grinding rolls to one side of the needle. When the cam revolves around into engagement with the roll, it causes a general swinging of the bent member and connected system about the frame fulcrum 237, thus shifting the grinding device across, and when in such lifted position the adjusting screw 248 may be operated to predetermine the position of the other roll with respect to the other side of the needle.

From the above description it will be understood that the two grinding rolls are maintained in constant high speed rotation, and that as each needle comes into position for treatment the grinding rolls are bodily lifted and moved inwardly to grind one side of the needle, then shifted across for grinding the other side, and returned outwardly and downwardly to initial position, during which inward and outward movements the rotation continues. When returned outwardly and dropped to their original position, the rolls remain there until the next needle is brought to this station of the apparatus.

*Second treating device and its actuation*

The second treatment is effected at station F by the device 32, the details and connections of which are shown in Figs. 1, 3, 9 and 11, 16 and 17 in connection with Figs. 13 and 14. The device comprises a lower or grinding member or stone 255 carried on a supporting or holding disk 256 and an upper finishing member 257 of leather or felt attached beneath a support or holding disk 258. The members are arranged to have two kinds of movements, first, a separating or opening movement to permit the needle to enter between them followed by a closing movement upon the needle, and second, a rapid reciprocation of the combined members along the length of the needle to perform the finishing treatment of its under and upper edges, the upper edge including the spring beard and being therefore treated by leather or resilient material rather than an abrasive stone.

The mountings and connections for the described elements may be substantially as follows. The holder 256 of the lower element is shown provided with a threaded shank 259 extending downwardly and secured at its lower end by a lock nut 260 to a pivoted support or arm 261 interiorly threaded to receive the shank. The arm 261 is shown pivoted to a carriage 263 which may consist of sheet metal bent into the form of the letter U if observed in top view. The carriage 263 is shown connected by headed screws 264 to the upper end of an upright carrying lever 265, the lower end of which is fulcrumed, at 266 to a fixed frame part 20 as to permit swinging of the lever and thereby a rapid reciprocation of the device radially inward and outward, as will be further described.

The arm 261 and the grinding member 255 carried thereby are normally held in their raised or operative position by means of a compression spring 267 pressing upward upon the shank 259, the lower end of the spring mounted on a bracket 268 extending inwardly from the lever 265. To limit the upward movement of the parts pressed by the spring 267 there is arranged a stop 269 on the carriage 263 in a position to be contacted by the arm 261 in its raised position.

The parts may be adjustable to determine the raised or working position of the lower finishing member, and the threaded shank 259 suffices for this purpose.

The holder 258 for the upper finishing member is shown as having an upwardly extended threaded shank 270 held by a lock nut 271 at the inner swinging end of a pivoted support or arm 272, the outward extension or tail of which is pressed upwardly by a spring 273 which has its lower end mounted on a bracket 274 attached to the upright lever. The strengths of the two springs 267 and 273 are so related that the spring 267 normally may operate to hold the finishing elements in their upward or normal position, with the arm 261 in contact with the positioning stop 269.

It will be noted that the two finishing members 255 and 257 are substantially circular in outline and that their mounting is such that from time to time they may be shifted in a rotary manner so as to bring a new grinding or polishing surface into action, thus preventing the wearing of a groove by continued action along a single line. This adjustment to distribute wear may be effected in any convenient manner, for example by loosening the nuts 260 and 271, turning the finishing members, and tightening the nuts.

The rapid oscillations of the supporting lever 265 to give the finishing movements to the device may be effected in various ways, for example by pivoting at 276 on the lever, the pitman 277 of an eccentric 278 mounted on a fast rotating shaft 279 mounted in a bearing block or yoke 280 attached at the under side of the machine table 54, as well shown in Figs. 11, 16 and 17.

The actuation of the shaft 279 may be best traced by reference to Fig. 13. The shaft 279 is necessarily set at a slant due to the position of the finishing device 32 as seen on Fig. 9, and this shaft is shown connected by a flexible coupling 282 with a second shaft 283 extending fore-and-aft. The shaft 283 is shown mounted near its front end in a yoke bearing block 284 and near its rear end a fixed bearing 285, and at its rear end it carries a sprocket wheel 286 driven by a sprocket chain 287, as best shown in Figs. 11 and 13. The sprocket chain may be passed over an idler pulley 288 mounted on a spring presser carrier, to take up slack, and may be driven by a sprocket wheel 289 near the rear end of the high speed or power shaft 126, as shown also in Fig. 14. By these connections the coupled shafts 283 and 279 are turned at high speed, due to which the upright lever 265 and the finishing device 32 carried thereby are constantly reciprocated inwardly and outwardly with rapid movements so that each needle will have its top and bottom surfaces treated by a large number of reciprocations of the treating members 255 and 257. As will appear, the polishing device 33 at station F is similarly rapidly reciprocated, from the same system, namely by eccentric on shaft 283.

As already stated the finishing members separate or open to receive each advancing needle, and close upon the needle for finishing purposes, and again open to permit the needle to be advanced away to the next treatment. The opening and closing movements may be automatically effected in time with the travel of the needle by a mechanism such as that illustrated and described as follows. Attached to the swinging arm 261, for example by the nut 260, is a connecting extension 292 from which extends a wire 293 which may be pulled downwardly to lower the grinder 255. Similarly a wire 294 may be attached to the tail end of the arm 272, so that when the wire is pulled down it will elevate the polisher 257. The two operating wires 293 and 294 may extend downwardly along the lever 265, preferably enclosed within a tube 295, the lower ends of the pull wires being attached by a connector 296 with an operating lever 297 pivoted to the upright lever and arranged to be pressed at the proper times to pull down both wires and separate the finishing members.

The mode of actuation of the lever 297 may be for example through a roll 299 mounted at the top end of a bracket 300 secured to a swinging lever 301, all as shown in Figs. 16 and 17. Referring also to Figs. 18 and 19 the lever 301 is seen to be extended rearwardly to a fulcrum 302 mounted at the top end of a fixed post 303. At an intermediate point the lever carries a cam roll 305 resting upon a cam 306 mounted on the main horizontal shaft 130, so that the cam can lift the lever and hold it at its normal elevated position as shown in Figs. 16 to 19 or can allow it to descend under the downward pull of a spring 307 at the free end of the lever. When the cam allows the spring to pull the lever full down then the roller 299 strikes the operating lever 297 to pull the wires and open up the finishing device, which is caused to close again by the cam letting up the lever when the next needle comes to rest in proper position between the members.

*Third treating device and its actuation*

The third finishing treatment is effected at station G by the device 33 as shown in the diagram and general Figs. 1, 4 and 9, with the details best shown in Figs. 11, 18, 19 and 22, with reference also to Figs. 13 and 14 for certain connections. The device is shown as consisting of polishing members or pads 310, there being two of them set vertically in opposition so that when separated horizontally they may receive each needle between them and close upon the needle, the pads being in constant reciprocation along the length of the needle so as to polish the lateral sides which already have been ground at station E. In addition to the reciprocating movements and the opening and closing movements the device has bodily dropping and lifting movements so as to allow the advancing needle to clear the top of the device before the latter is lifted into operative position.

In detail the polishing device 33 comprises the opposed pads 310 of leather, felt or the like, each mounted on a support or disk 311 which disks have threaded shanks 312 secured by lock nuts 313 to upright arms 314 pivoted at their lower ends at 315 to permit swinging movements toward and from each other. The arms 314 are both pivoted to a carriage 316 shown in the shape of an inverted T and mounted at the upper end of an upright carrying lever 317 which at its lower end is fulcrumed at 318, not to a fixed frame part, but to another lever 319 which itself is capable of up and down movements about a fulcrum 320, as will be later described.

The carrying arms 314 may be pulled toward each other by a spring 321 so that the polishing members will exert pressure on the needle. Each arm is shown as provided with a stop screw 322, the extremities of which contact against the edges of the upright lever 317, insuring that the polishing members come together symmetrically.

For opening or spreading apart the arms and polishing members the following connections are shown. Each of the arms 314 has rigidly attached to it an extension 323. These two extensions have rounded ends lying centrally adjacent to each other as shown in dotted lines in Fig. 19. It is only necessary to wedge these extensions apart to open up the polishing device to receive the needle. For this purpose a spreader or sliding rod 325 is shown, its upper end arranged to enter between the extensions 323. The rod extends downwardly through a guide tube 326 and the rod at its lower end is pivoted to one end of the operating lever 327 to the other end of which may be thrust upwardly and downwardly to cause the closing and opening movements. This action may readily be effected by a contacting member 328 mounted on top of the swinging lever 301, and the contact member have upper and lower fingers 329 and 330 for forcing down and up the end of the operating lever. Preferably the fingers are spaced substantially apart so that the throw of the lever 327 is only effected at the latter part of the throw of the lever 301, which as already stated is the lever which in its downward movement effects the opening of the finishing members of the preceding device 32, so that the lift of the lever 301 brings about the closing of both devices 32 and 33 on successive needles.

As with the device 32 so it is intended to reciprocate rapidly the polishing device 33 along the length of the needle. As shown in Figs. 18 and 19 this is effected through a leftward extension 332 of the upright swinging lever 317, the extremity of such extension connected by a pitman 333 with an eccentric 334 secured on the shaft 283 already referred to, so that the fast rotation of the shaft causes the rapid reciprocation of the device.

With respect to the polishing device 33 it remains only to describe the bodily upward and downward movements and the means for effecting the same. The vertical lever 317 which carries the device is capable of sliding vertically in the narrow slot 335 in the machine table 54 as seen in Figs. 18 and 19, this slot being elongated in a direction to permit the in and out reciprocation thereof as described. The lifting and lowering is effected by the swinging of the long horizontal lever 319, upon the left or free end of which the upright lever is pivoted, the horizontal lever having a curved shape to avoid conflict, as shown in Fig. 11.

The up and down swinging of the supporting lever 319 is shown effected by a link 336 by which the lever is hung from a cam lever 337 mounted on the same fulcrum 302 as the lever 301, and extending forwardly to where it carries a cam roll 338 resting upon the periphery of a cam 339 mounted on the main horizontal shaft 130 adjacent to the cam 306. The contour of the cam 339 is such that for a small part of each cycle, corresponding to the advancing movement of the needles, the lever 337 is lowered, and the polishing device 33 correspondingly lowered, being subsequently elevated after the new needle is in position, so that the lifting of the device places a polishing pad at each side of the needle ready to treat the needle upon the closing of the device, the device being in continuous reciprocation along the needle's length.

*Fourth treating device and its actuation*

The fourth treatment is preferably for cleaning out and finishing the groove of the needle. This groove is at the top side, the needle standing as in Fig. 7, and the groove requiring to be cleaned of loose material and abraded or finished to insure proper cooperation with the spring beard. This action takes place at station H by means of device 34 preferably comprising a fast rotating brush 345, which may be merely reciprocated inwardly over the needle and outwardly again for the desired treatment, this arrangement being best shown in the general diagrams and views Figs. 1, 5 and 9, and in detail in Fig. 15 and the connections in Figs. 13 and 19.

The brush 345 may be a bristle brush, for example with fine metallic wire bristles and is shown in Fig. 9 as mounted on a shaft 346 which is arranged for rotation in a head or carriage 347 mounted at the upper end of an upright carrying lever 348 fulcrumed at its lower end at a fixed point 349 as shown in Fig. 19. Cooperating with the brush is a needle support or shelf 359 mounted fixedly above the machine table by means of a bracket 351. The shelf is at such a height that each advancing needle will move to place closely above it, and the shelf takes the pressure as the brushing action is applied on top of the needle.

In order to rotate continuously the brush there is shown a pulley 352 on the brush shaft, this pulley being driven by a belt 353 which is carried downwardly and around a larger pulley 354 mounted directly on the high speed power shaft 126.

The inward and outward movements of the brushing device may be effected by swinging the upright lever 348 which for this purpose passes through a radial slot 355 in the machine table. The in and out movements may be transmitted to the lever by a connecting rod 356 attached as in Fig. 19 and extended to a lever 357 centrally fulcrumed at 358 as in Figs. 13 and 15. The other end of the lever 357 is pivoted to a long connecting rod 359 which extends forward and at its front end is pivoted to the swinging cam lever 231, preferably at the point of the pin and slot connection 233. By this arrangement the cam 235, already described as effecting the in and out movements of the grinding device 31, effects also the in and out movements of the brushing device 34, these movements occurring while the needles are held at the respective stations. The same cam and connections take part also in the in and out movements of the finishing devices at stations J and K yet to be described.

The transfer at station I of each needle 25 from a gripper 79 of the first carrier to a gripper 113 of the second carrier has already been referred to. With the gripper 113 in open condition at the dotted line position in Fig. 21 it moves outwardly to the full line position and closes upon the beard end of the needle, following which the gripper 79 immediately opens, releasing the needle, and the gripper 113 returns inwardly, separating the needle from the gripper 79, so that the two carriers can at once advance, the grippers moving away from each other in opposite directions, and the gripper 113 resuming its outward position before the further treatments, by the cam actions already described.

*Fifth and sixth treating devices and their actuation*

These last two finishing treatments at stations J and K are performed by devices 35 and 36 shown in the diagrams and general Figs. 1, 6 and 9, and in the details in Figs. 12, 20 and 21 and others.

Except for differences in the treating members or rollers the devices and mechanisms are so closely alike that the description can best be made by joint reference to both of them, and for distinction the reference numbers will correspond in the last two figures, those for device 35 commencing with reference 364 and those for device 36 commencing with reference 464. We thus have for the device 35 a pair of grinding or rough finishing rollers 364 and 365 and for the device 36 polishing rollers 464 and 465.

The rollers 364 or 464 may be referred to as idler rollers as they are preferably driven only from the surfaces of the active rollers 365 or 465. The idler rollers are mounted at the top of short shaft 366 or 466. These shafts extend downwardly and carry spaced collars 367 or 467 between which the shafts are carried in bearing blocks 368 or 468 having movements to be described. Above the rollers the shafts carry confining rings and nuts 369 or 469.

Each of the active rollers is mounted at the top of a long shaft 370 or 470 the shaft carrying spaced collars 371 or 471 between which are elongated bearings or sleeves 372 or 472 each having at its lower end an enlarged and squared head 373 or 473, which may be integral, or a separate block. The reduced portions of these bearings are also shown squared, and are arranged to slide radially with respect to the second carrier, being guided in slots 374 or 474 formed in the machine table 54. Above the rollers the long shafts carry confining rings and nuts 375 or 475.

It will be understood that the long shafts of the active rollers in each device are for the purpose of transmitting rotary motion to each pair of rollers. In addition to their rotation the rollers are arranged for a yielding movement toward and from each other and a bodily inward and outward movement to carry them along the lateral sides of the butt end of the needle 25.

The long and short bearings may be coupled together for their relative swinging movements as follows. Each bearing 368 or 468 is shown attached by an upper bar 376 or 476 to an upper swivelled block 377 or 477 located outwardly of the bearing. Similarly each long bearing is shown attached by a lower bar 378 or 478 to a lower block 379 or 479. The upper and lower blocks are both bored vertically and fitted upon a vertical axle 380 or 480 having upper and lower spaced collars 381 or 481 confining the blocks, and having a downward extension engaging in a guide slot 382 or 482 formed in a guide bar 383 or 483 secured in a radial position upon the top side of the machine table 54.

By this arrangement the roller devices may be bodily shifted radially inward and outward, while at the same time the mounting of each pair permits the rollers to be drawn forcibly together for finishing purposes but to yield or separate to admit each needle. For drawing the rollers toward each other the respective bars 376 or 476 and 378 or 478 may be interconnected by a pull spring 384 or 484 attached to the upper bar and to an upward projection 385 or 485 of the lower bar, by an adjusting means 386 or 486 as shown in Fig. 20.

Preferably one of the rollers 365 or 465 has no swinging movement, the inner end of bar 376 being guided by the sliding of the bearing 372 or 472 in the table slot 374 or 474, while its outer end through rod 380 is guided in fixed guide 383. The other roller 364 or 464 can swing toward roller 365 or 465, pulled by spring 384 or 484, and it derives its rotation by contact of the rollers, both of which preferably are padded, or at least one of them, to ensure driving contact when a needle is between them.

The inward and outward movements may be transmitted to the described roller systems by connections arranged below the machine table extending from actuating sources to the enlarged bearing heads 373 or 473 of the long shafts 370 or 470, as best shown in Figs. 20 and 13, these figures showing that the squared heads of the bearings do not stand at the same angle as the square bodies thereof, the bodies being squared in a direction to slide radially in the slots of the table while the heads, which may be separate blocks, stand at such angle as to cooperate with the actuating connections next to be described.

Each of the squared bearing heads has attached to it a connector or stirrup 390 or 490 from which extends a connecting rod 391 or 491, the latter bent to avoid certain parts as shown in Fig. 13. The other ends of the two connecting rods are both pivoted to a common guiding arm 392 fulcrumed on a fixed frame part 393. This arm determines the direction of movement for the ends of the connecting rods such that each of them may transmit a radial inward and outward movement to the respective described roller systems, the directions being indicated by the sides of the squared portions 372 or 472 of the elongated bearings, corresponding with the radial slots 374 or 474 as seen in Figs. 9 and 20. For actuating these parts there is shown a link 394 which may be adjustable in length, this link extending from the free end of arm 392 to one arm of a connecting lever 395 having a fixed fulcrum 396 beneath the machine table, the other end of this lever being connected by a link 397 with the junction of the lever 357 and connecting rod 359 already described. In this way the oscillations of cam lever 231 are transmitted through the rod 359 and connections 397 or 395 and 394 to the arm 392 which thereby brings about the inward and outward movements of the finishing roller devices 35 and 36 after each of the successive needles has been brought into proper relation therewith.

The two long vertical shafts 370 or 470 turn not only in the upper bearings already described, but in lower bearings 398 or 498 mounted near the base of the machine and arranged for tilting movement to allow for the swing of the shafts, and each shaft, directly above the bearing, is provided with a pulley 399 or 499. A belt 400 connects these two pulleys so that by driving one shaft the other of them is driven. This belt may have its stretches crossed or not according to the desired direction of rotation of the respective sets of rollers, which is preferably such as not to tend to extract the needles from the grippers.

To transmit rotation to the shafts one of them, namely the shaft 370, is shown as carrying a pulley 402 driven by a belt 403 which is carried over an idler pulley 404 and thence passes to a pulley 405 on the high speed power shaft 126. By this means both shafts are kept in continuous high speed rotation for the final two finishing operations upon the needle.

By the described mechanism each of the successive needles has its butt end first rough finished at station J at the two lateral sides, and then polished by the rollers at station K, in each case the finishing action consisting of the passing simultaneously along the sides of the needle of a pair of continuously rotating rolls moved first inward and then outward for each needle.

Following the final treatments at stations J and K, each needle on its next advance, is brought above the delivery receptacle 37, which is representative of any means of receiving the completed needles. The cam 180 still holds the gripper and needle in outward position, and while in this position the gripper is caused to open by the descent of the arm 169, thus discharging the needle into the receptacle.

The complete method, operations, constructions and actuations have thus been fully indicated. While the described order of treatments is preferred such order may be varied and indeed the first group of treatments might be interchanged with the second group by turning the needle end for end. In the claims therefore the invention is in some cases described as involving the gripping of each of the successive needles by one end, or its first end, meaning either end, and applying treatments to the other or second end, and thereupon gripping the needle by its second end and applying finishing treatments to its first end. The complete method or operation may be described as a continuous one which takes care of both the rough and smooth finishing treatments of both ends of the needle, it being continuous in the sense that a continued succession of needles passes through the machine, and each needle, when once introduced, is automatically carried through its path of travel, and its various treatments, although in a step by step manner, requiring no manual attention from the original insertion of each needle until its final delivery. Various combinations of features, both method and mechanical features, and various individual features of treatment or mechanism are considered to be new, and are so claimed, in relation to the art of finishing consisting of grinding or polishing, of needles of the kinds referred to, especially spring beard knitting needles. This particular type of needle may vary in length from 1½″ to 2″, more or less, and the machine is arranged to handle and operate upon needles of varying lengths. The treatments at the two ends of each needle are carried so far as to overlap, with a margin permitting variations in length of needle. In certain respects the described order of operations is considered important, to the extent as set forth in certain of the claims. For example the lateral sides of each needle at the spring beard end are first subjected to a particular grinding action, first at one side, by a rotating roller, and then at the other side by a similar roller, while the needle flexes one way or the other, and this being a grinding or rough finishing treatment, and subsequently followed by a smooth finishing or polishing of the same lateral sides of this end of the needle.

There has thus been described a machine for finishing knitting or similar needles, particularly of the spring beard type, attaining the advantages and embodying the principles of the present invention. Since various matters of operation, mechanism, combination, arrangement and detail may be modified without departing from the underlying principles it is not intended to limit the invention to such matters except so far as set forth in the appended claims.

What is claimed is:

1. In an automatic machine for finishing knitting needles, the combination of a first carrier having radial grippers for holding each needle by its first end during treatment of its second end, a second carrier having radial grippers for subsequently holding the needle by its second end during treatment for its first end, means for advancing the carriers in step by step coordination, means for bodily retracting one gripper to prevent conflict at the transfer point, and restoring it when in alinement, whereby the needle will be inserted in the gripper of the second carrier, means for opening and closing the grippers in coordination for transferring the holding of the needle from one to the other carrier, means for applying finishing treatments to the second end of the needle while held in the first carrier, and means for subsequently applying finishing treatments to the first end while held in the second carrier.

2. A machine as in claim 1 and wherein each gripper of the second carrier is arranged to retract radially to clear each needle and return to grip the needle for transfer from the first carrier.

3. In an automatic machine for finishing knitting needles, the combination of a carrier having radial grippers for receiving and holding each needle by one end during treatment of its other end, means for advancing the carrier in step by step manner, means for opening and closing the grippers in coordination with the advance movement, means for applying finishing treatments to the needle while held in the gripper, means for infeeding successive needles into the respective grippers while open, and means operative during and by reason of the advance of the carrier for longitudinally resetting needles after infeed and gripping thereof.

4. In an automatic machine for finishing knitting needles, the combination of one or more carriers having radial grippers for holding each needle by one end during treatment of its other end, means for advancing the carriers in step by step manner, means for opening and closing the grippers, means for applying finishing treatments to the needles while held in the grippers, and infeed means comprising a rotary needle supporting wheel or disk, having many radial grooves for holding needles to be infed to the grippers, and arranged for the needles to advance normally out of the plane of the grippers, with means to shift bodily the wheel to position each foremost needle into gripping relation to a gripper while the latter pauses in open condition and before closing thereof.

5. A needle finishing machine as in claim 4 and wherein the infeed wheel is mounted for bodily tilting about an axis removed from the carrier, with means for tilting it to and from the position wherein it positions the successive needles in the grippers.

6. A needle finishing machine as in claim 4 and wherein is a contact device arranged in such position that on each bodily shift of the infeed wheel the device is contacted by one or more needles to readjust the latter properly in the wheel before positioning in the gripper.

7. A needle finishing machine as in claim 4 and wherein is a guard normally overlying the foremost needle or needles, and a connection whereby the guard is caused to displace and uncover the foremost needle as the wheel shifts to position such needle in a gripper.

8. A needle finishing machine as in claim 1 and wherein each gripper on the first carrier has spring means to close it and a shiftable member to open it, a gripper opening lever with means to shift it in each cycle and contacts for opening two grippers on each shift, namely the grippers at the infeed and transfer points, and means to infeed a needle into each open gripper at the infeed point.

9. In an automatic machine for finishing knitting needles, the combination of a first rotary carrier having radial grippers for holding each needle by its first end during treatment of its second end, a second rotary carrier having radial grippers for subsequently holding the needle by its second end during treatment of its first end, means for advancing the carriers in step by step coordination, means for retracting each gripper of the second carrier at the transfer point, and returning it to enclose the needle, means for opening and closing the grippers in coordination for transferring the holding of the needle from one to the other carrier, means for applying finishing treatments to the second end of the needle while held in the first carrier, and means for subsequently applying finishing treatments to the first end while held in the second carrier.

10. A needle finishing machine as in claim 9 and wherein the second carrier has a rotary body substantially higher than the first carrier, with radial slides therein, and grippers depending below the slides to the needle level, and cam means causing each gripper slide to withdraw inward before its gripper comes to transfer point, then to return outward for the transfer of the needle, and withdraw inward again, and thereafter return outward to hold the needle in treating position.

11. A needle finishing machine as in claim 9 and wherein the second carrier gripper retracting and returning means comprises an active cam and a passive cam, both opposed by a spring tending to retract each gripper; the active cam moving each gripper outward at the transfer point to receive a needle and permitting its retraction, and the passive cam moving each gripper outward by reason of its advance from the transfer point, and maintaining it so during the treatments thereof.

12. A needle finishing machine as in claim 9 and wherein the means for opening and closing the grippers of the second carrier comprise a cam controlled part, as the vertically reciprocating rod 164 and head 165, with extensions to the transfer point and delivery point respectively, adapted to open each gripper as it pauses at the delivery point, and to close it as it pauses at the transfer point.

13. In a machine for finishing spring beard or similar knitting needles, means for holding and advancing a needle by one end presenting its other end for treatment, and means for applying successive treatments to the needle, including a side grinding device comprising a pair of grinding rolls, means for rotating the rolls at speed, means for moving the pair of rotating rolls lengthwise of the needle with one roll treating one side, and then returning with the other roll treating the other side, while the needle flexes one way and then the opposite.

14. A machine for finishing knitting needles as in claim 13 and wherein are means for shifting the pair of rolls axially of their rotation during the grinding of the needle sides.

15. A machine for finishing knitting needles as in claim 13 and wherein are means for shifting the pair of rolls axially of their rotation during the grinding of the needle sides, comprising a floating bearing for the shafts of the rolls and cam actuated means for lifting and lowering the bearing and rolls.

16. In a machine for finishing spring beard or similar knitting needles, means for holding and advancing a needle by one end presenting its other end for treatment, and then by its other end presenting its first end for treatment, and means for applying successive treatments to the respective ends of the needle, including a side grinding device comprising a pair of spaced grinding rolls, twin shafts carrying the same, a carriage in which the twin shafts rotate, means for rotating the shafts at speed, means for moving the carriage and rotating rolls lengthwise along the needle with one roll treating one side, and thence returning with the other roll treating the other side, and means for shifting the carriage and rolls laterally relatively to the needle between the lengthwise movements.

17. In a machine for finishing spring beard or similar knitting needles, means for holding and advancing a needle by one end presenting its other end for treatment, and means for applying successive treatments to the needle, including a side grinding device comprising a pair of spaced grinding rolls on upright shafts, a carriage bearing the shafts, means for rotating the rolls at speed, and means for moving the shafts and rolls inward along the needle with one roll treating one side, and thence outward with the other roll treating the other side, comprising a rocking frame (225) to which the carriage (219) is slidably connected, timed means sliding the carriage for the in and out movements of the rolls, and timed means rocking the frame for lateral movements of the rolls to shift from side to side of the needle.

18. A needle finishing machine as in claim 17 and wherein are adjustable means determining the extent and limits of the respective movements.

19. In a machine for finishing spring beard or similar knitting needles, means for holding and advancing a needle by one end presenting its other end for treatment, and means for applying successive treatments to the needle, including a finishing device comprising a pair of finishing members, means for rapidly reciprocating the member along the needle, and means for separating the members to receive each needle and closing them together into rubbing relation to the needle.

20. A needle finishing machine as in claim 19 and wherein the separating and closing means comprises a closing spring, with a stop determining the closed positions, and timed means separating the members.

21. In a machine for finishing spring beard or similar knitting needles, means for holding and advancing a needle by one end presenting its other end for treatment and then by its other end presenting its first end for treatment, and means for applying successive treatments to the respective ends of the needle, including a side grinding device comprising a pair of spaced grinding rolls, means for rotating the rolls at speed, means for moving the pair of rotating rolls inward along the needle with one roll treating one side, and thence outward with the other roll treating the other side, and a subsequently operating side polishing device comprising a pair of opposite pads, means for rapidly reciprocating the pair of pads along the needle, means for separating and closing the pads upon the needle, and means for lowering the device out of the path of the needle during the advance of the latter and raising it in open condition to embrace the needle.

22. In a machine for finishing spring beard or similar knitting needles, means for holding and advancing a needle by one end presenting its other end for treatment, and means for applying successive treatments to the needle, including a side finishing device with means for moving it along the needle, and a subsequently operating device for cleaning the needle groove, comprising a rotary brush at the groove side of the needle, an abutment at the opposite side to take the thrust, means for rotating the brush at speed, and means for moving it lengthwise along the needle.

23. A needle finishing machine as in claim 13 and wherein is a groove finishing device or rotary bristle brush, means for rotating the brush at speed, a carrier for the brush, and connections for shifting the carrier lengthwise of the needle, actuated from the means which shifts the grinding rolls lengthwise of the needle.

24. In a machine for finishing spring beard or similar knitting needles, means for holding and advancing each needle by one end presenting its other end for treatment and then by its other end presenting its first end for treatment, and means for applying successive treatments to the respective ends of the needle, including one or more devices for finishing the sides of the butt end of the needle, each such device comprising a finishing roller on an upright shaft, a bearing for the shaft, means for rotating the roller shaft at speed, and means for shifting the shaft and roller lengthwise of the needle.

25. A needle finishing machine as in claim 24 and wherein with each such roller is a second roller, means hinging the second roller to swing toward and from the first roller, and spring means holding the rollers yieldingly together, whereby as the rollers pass along the two sides of the needle the first roller will drive the second roller.

26. In an automatic machine for finishing knitting needles, the combination of a first rotary carrier having radial grippers for holding each needle by its first end during treatment of its second end, a second rotary carrier having radial grippers for subsequently holding the needle by its second end during treatment of its first end, means for advancing the carriers in step by step co-ordination to bring the needles to the places of treatment, means for transferring the holding of the needle from one to the other carrier, devices for applying finishing treatments to the second end of the needle while held in the first carrier, and devices for subsequently applying finishing treatments to the first end while held in the second carrier, said treatments including rapid rotation or reciprocation of treating members and slow movements along the length of the successive needles; and actuating mechanism including a high speed power shaft, a speed reduction gearing, a slow speed main shaft, an intermittent drive device, connections from the intermittent drive device for advancing the carriers step by step, connections from the main shaft for giving the slow movements of the treating devices along the needles, and connections from the power shaft for giving the rapid finishing movements to the devices.

27. In an automatic machine for treating needles, the combination of one or more carriers having radial grippers for holding each needle by one end during treatment of its other end, means for advancing the carriers in step by step manner, means for opening and closing the grippers, means for applying treatments to the needles while held in the grippers, and infeed means comprising a rotary needle support, having substantially radial grooves for holding needles to be infed to the grippers, said rotary support arranged for the needles to advance normally out of the path of the grippers, and having means to shift bodily the wheel to position each foremost needle into gripping relation to a gripper while the latter pauses in open condition and before closing thereof.

28. In an automatic machine for treating knitting needles, the combination of one or more carriers having radial grippers for holding each needle by one end during treatment of its other end, means for advancing the carriers in step by step manner, means for opening and closing the grippers, means for applying finishing treatments to the needles while held in the grippers, and infeed means comprising a rotary needle supporting wheel, having grooves for holding needles to be infed to the grippers, said wheel arranged normally for the needles to advance out of the plane of the grippers, and having means for bodily tilting it about an axis removed from the carrier to position each foremost needle into gripping relation to a gripper while the latter pauses in open condition and before closing thereof.

29. In a machine for finishing grooved knitting needles, means for holding and advancing a needle by one end presenting its grooved end for treatment, and means for applying treatment to the needle while so held, including a device for cleaning the needle groove, comprising a rotary brush at the groove side of the needle, an abutment at the opposite side to take the thrust, means for rotating the brush at speed, and means for moving it lengthwise along the needle.

30. In a machine for finishing spring beard knitting needles, means for holding each needle by its beard end presenting its butt end for treatment, and means for applying treatments to the needle, including a device for finishing the sides of the butt end of the needle, said device comprising a finishing roller, a shaft carrying it, a bearing for the shaft, means for rotating the shaft at speed, and means for shifting the shaft and roller lengthwise of the needle.

31. A needle finishing machine as in claim 30 and wherein cooperating with the roller so rotated is a second roller, means mounting the second roller to swing toward and from the first roller, and spring means holding the rollers yieldingly together, whereby as the rollers pass along the two sides of the needle the first roller will drive the second roller.

In testimony whereof this specification has been duly signed by:

ALFRED HOFMANN.
OSWIN KANIS.